April 9, 1968  F. R. EMMONS  3,376,803
CABIN PRESSURE REGULATOR
Filed July 11, 1966  14 Sheets-Sheet 8 fig. 8 CRUISE WITH DIFFERENTIAL LIMITING

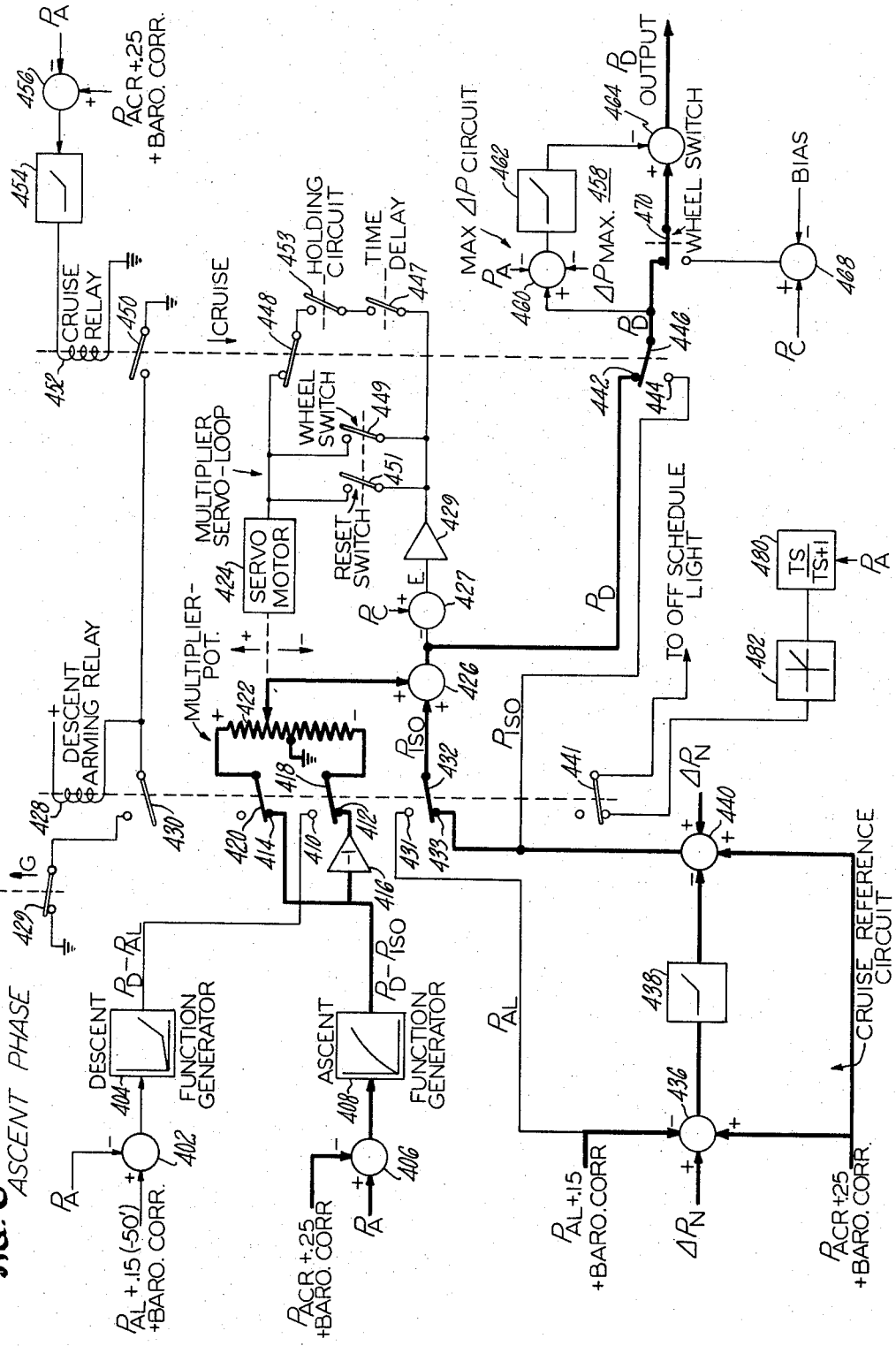

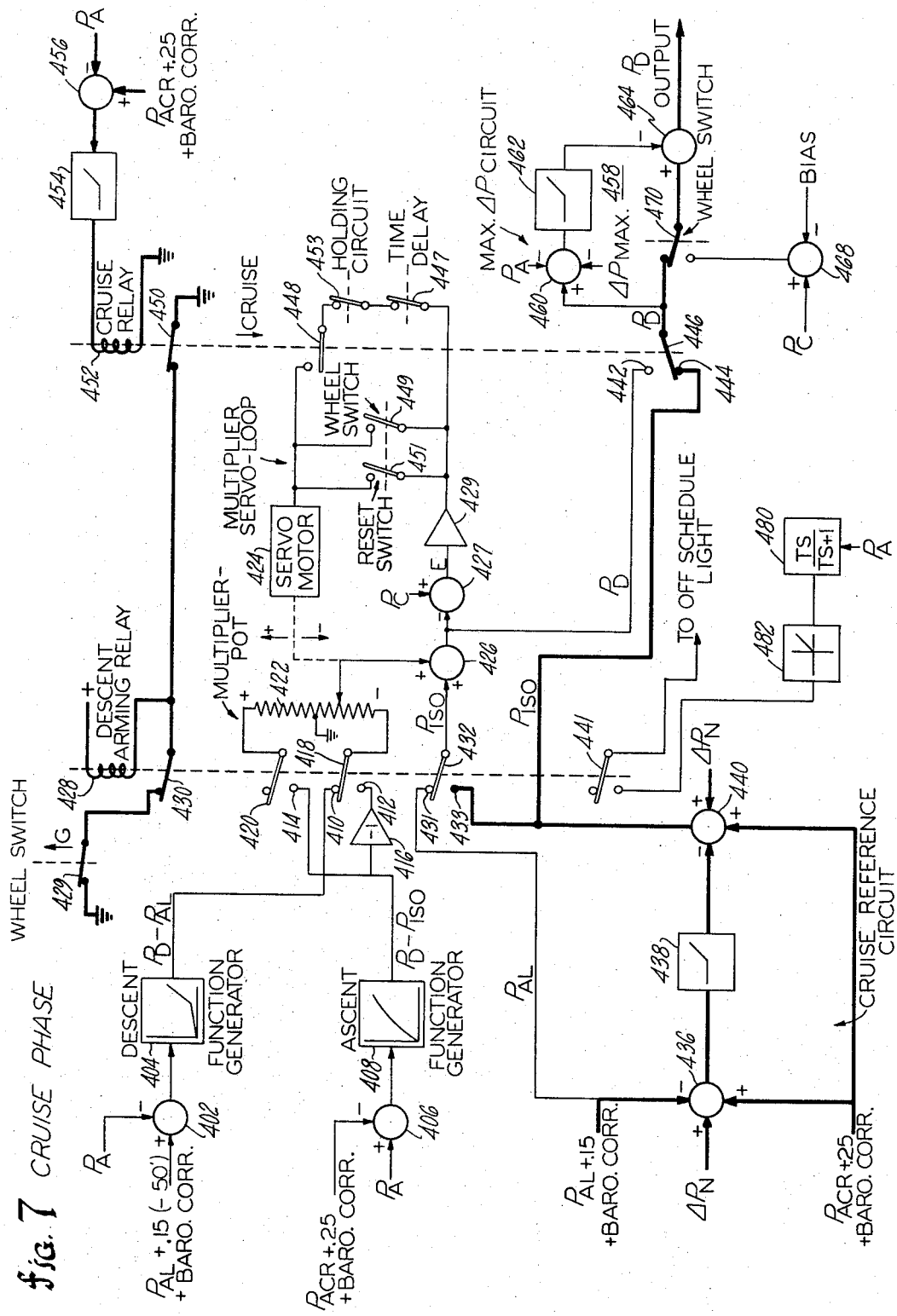

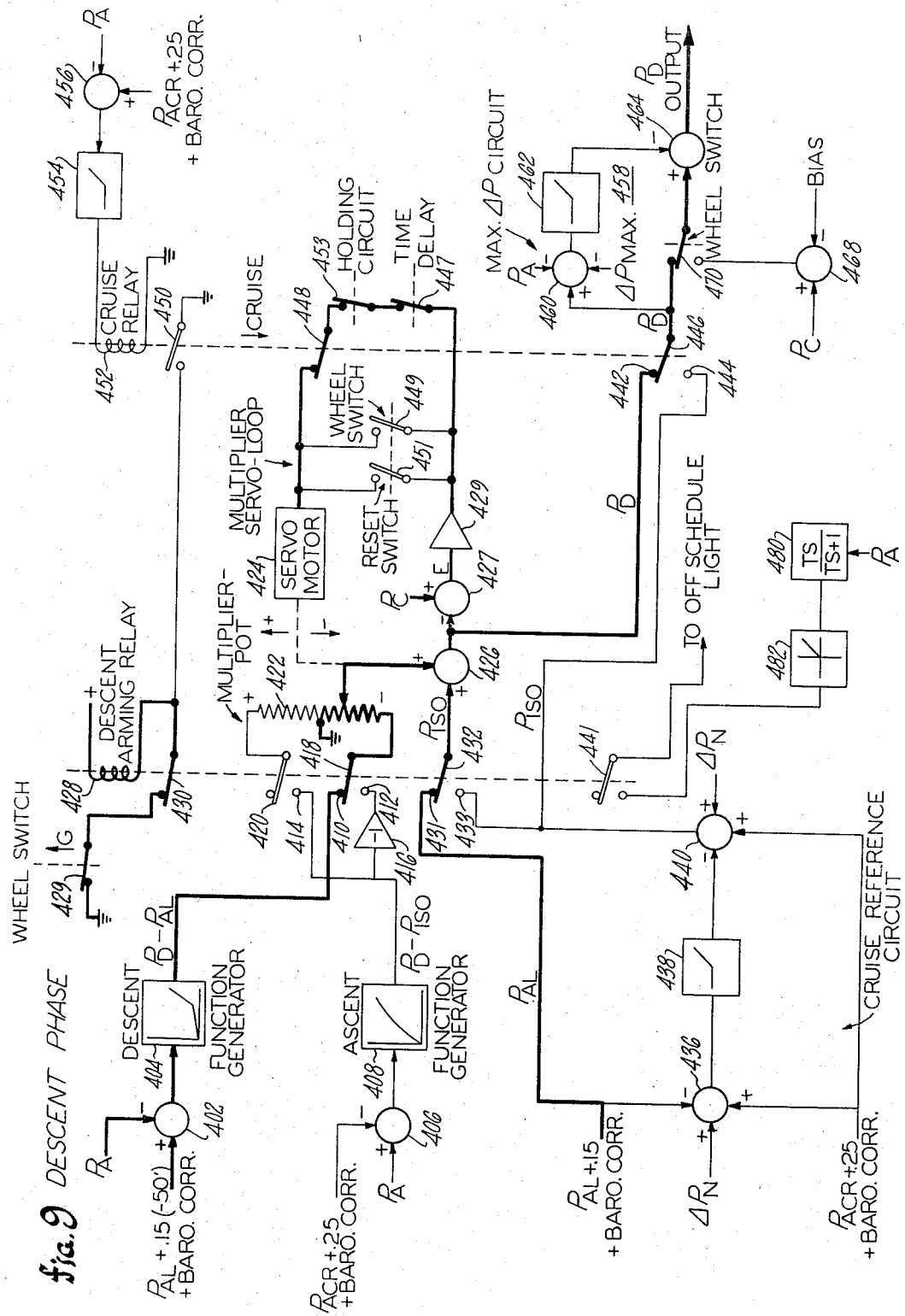

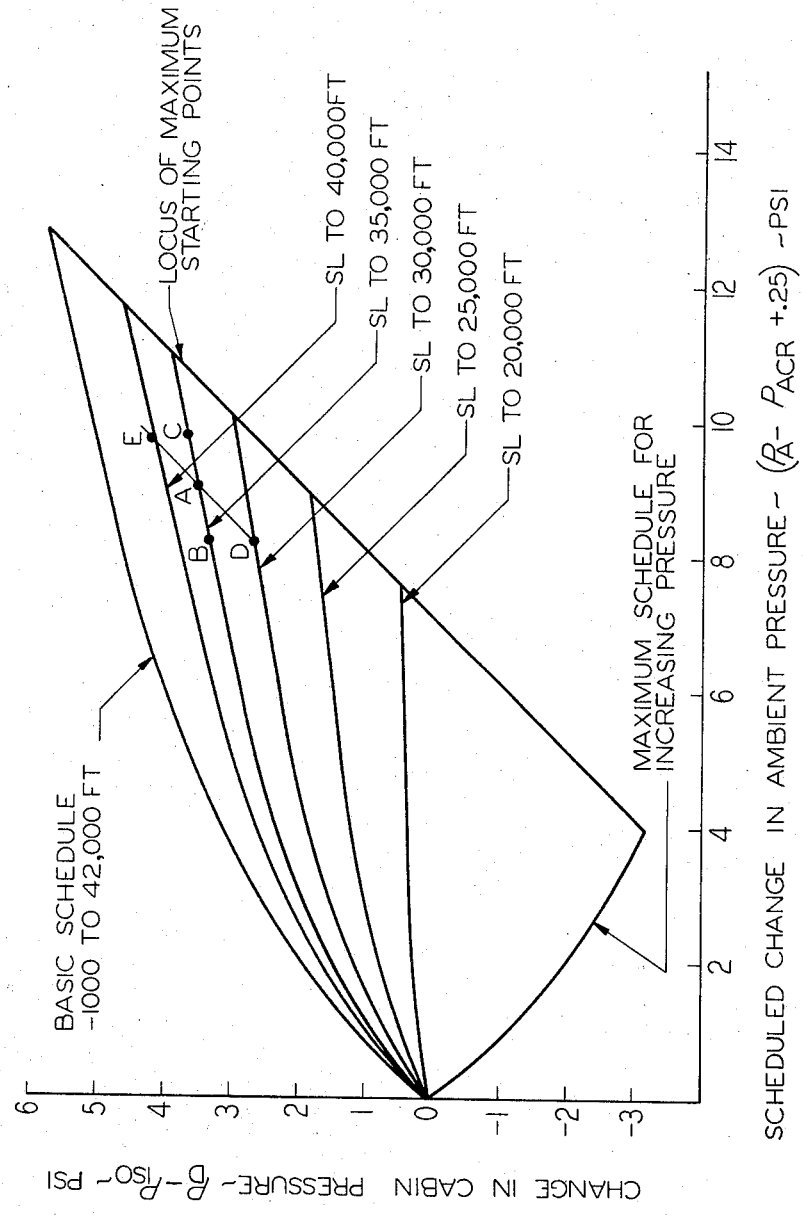

April 9, 1968 F. R. EMMONS 3,376,803
CABIN PRESSURE REGULATOR
Filed July 11, 1966 14 Sheets-Sheet 12
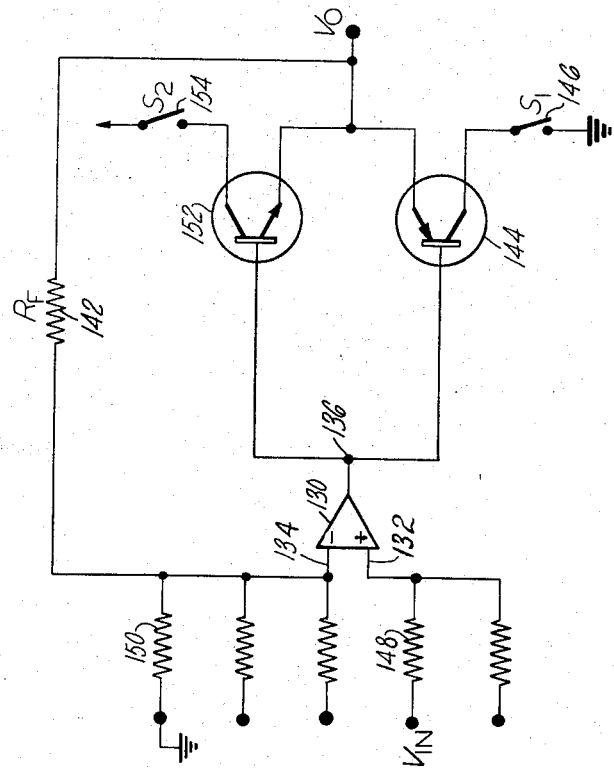
fig.12
fig.12A
fig.12B
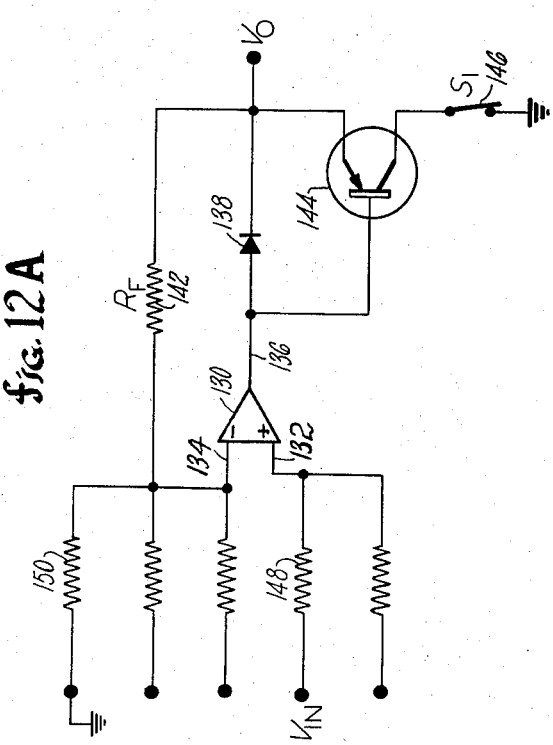
fig.12C
fig.12D $$\text{ASCENT} \quad P_D = P_{TO} + \frac{P_{ISO} - P_{TO}}{P_{TO} - P_{ACR}} f(P_{TO} - P_A)$$

$$\text{DESCENT} \quad P_D = P_{ISO} + \frac{P_{ISO} - P_{AL}}{P_{ACR} - P_{AL}} f(P_{ACR} - P_A)$$

United States Patent Office 3,376,803
Patented Apr. 9, 1968

3,376,803
CABIN PRESSURE REGULATOR
Floyd R. Emmons, Granby, Conn., assignor to United Aircraft Corporation, East Hartford, Conn., a corporation of Delaware
Filed July 11, 1966, Ser. No. 564,114
26 Claims. (Cl. 98—1.5)

This invention relates to an aircraft cabin pressure regulator. More specifically, it relates to an aircraft cabin pressure regulator wherein the cabin pressure is automatically scheduled throughout an entire flight profile of the aircraft.

An aircraft is designed to withstand a predetermined maximum pressure differential between the cabin and external ambient pressures which may vary from sea level up to as much as 42,000 feet for modern-day jet planes. It is uneconomical to design the aircraft so it can tolerate the maximum differential encountered with the cabin pressure at sea level and the aircraft at maximum altitude. The cabin pressure is therefore reduced to such an extent that the differential pressure does not exceed design limits. For safety and passenger comfort the cabin pressure is maintained as high as the design limitation on the differential pressure allows.

Jet aircraft today ascend and descend at high speeds for a variety of reasons such as safety, traffic control and economy. In view of the high aircraft speed and the traffic density near airports, the manual cabin pressure control of present day cabin pressure regulators is undesirable. During the ascent and descent phases, the flight engineer's attention could be more fruitfully directed at other critical functions. Furthermore, cabin pressure regulator adjustments for changing flight patterns are often required as a result of traffic density, the weather and other often unpredictable events so that an automatic cabin pressure regulator provides a clear advantage over the present day manual controls.

Prior art cabin pressure regulators require that the crew, before commencement of the ascent or descent modes, approximate expected cabin pressure changes and rates dependent upon expected flight condtions such as cruising altitude, landing altitude and descent time. The pilot would estimate the time required to descend or ascend and compute the cabin pressure rate required to approach the desired cabin pressure change at the termination of the flight mode. A common input to the cabin pressure regulator would be the expected rate of change, so that the cabin pressure would thereafter change according to this input regardless of any variations of the flight profile after the initial scheduling by the pilot. If for any reason the pilot would have to alter his flight profile, a rescheduling of the permissible cabin pressure change rates must be made involving the recomputation with manual adjustments. This procedure involves a substantial amount of personal attention during critical flight modes such as ascent and descent.

It is therefore an object of this invention to provide a cabin pressure regulator system which without crew attention automatically controls the cabin pressure throughout an entire flight profile.

It is a further object of this invention to provide a cabin pressure regulator wherein the actual cabin pressure is scheduled according to a predetermined desired cabin pressure signal.

It is still a further object of this invention to provide a cabin pressure regulator wherein the cabin pressure is controlled during the ascent and descent of the aircraft according to a scheduled pressure differential.

It is still further an object of this invention to provide a cabin pressure regulator for controlling the pressure in a cabin of an aircraft according to a schedule signal that varies as a function of a scheduled change in the external ambient pressure.

It is still another object of this invention to provide a cabin pressure regulator for controlling the pressure in the cabin of an aircraft according to a predetermined schedule wherein the schedule signal is limited in its rate of change within a predetermined range assuring maximum passenger comfort and safety to the aircraft.

These and other objects will become more readily apparent upon a review of the following figures and a description of a preferred embodiment.

In this invention, the cabin pressure of an aircraft is controlled during ascent and descent flight phases by generating a desired cabin pressure signal, $P_d$, as a function of the known change in external cabin pressure. This is then compared with a signal, $P_c$, indicative of the actual cabin pressure to produce an error signal. This error signal $\epsilon$, is used to modulate an outflow valve to control the cabin pressure and reduce the error to a minimum. During the cruise flight phase of the aircraft, the cabin pressure $P_c$ is controlled by scheduling a desired isobaric cabin pressure signal, $P_{iso}$, which is compared with the actual cabin pressure signal $P_c$ to produce the error signal $\epsilon$.

Figure 4:
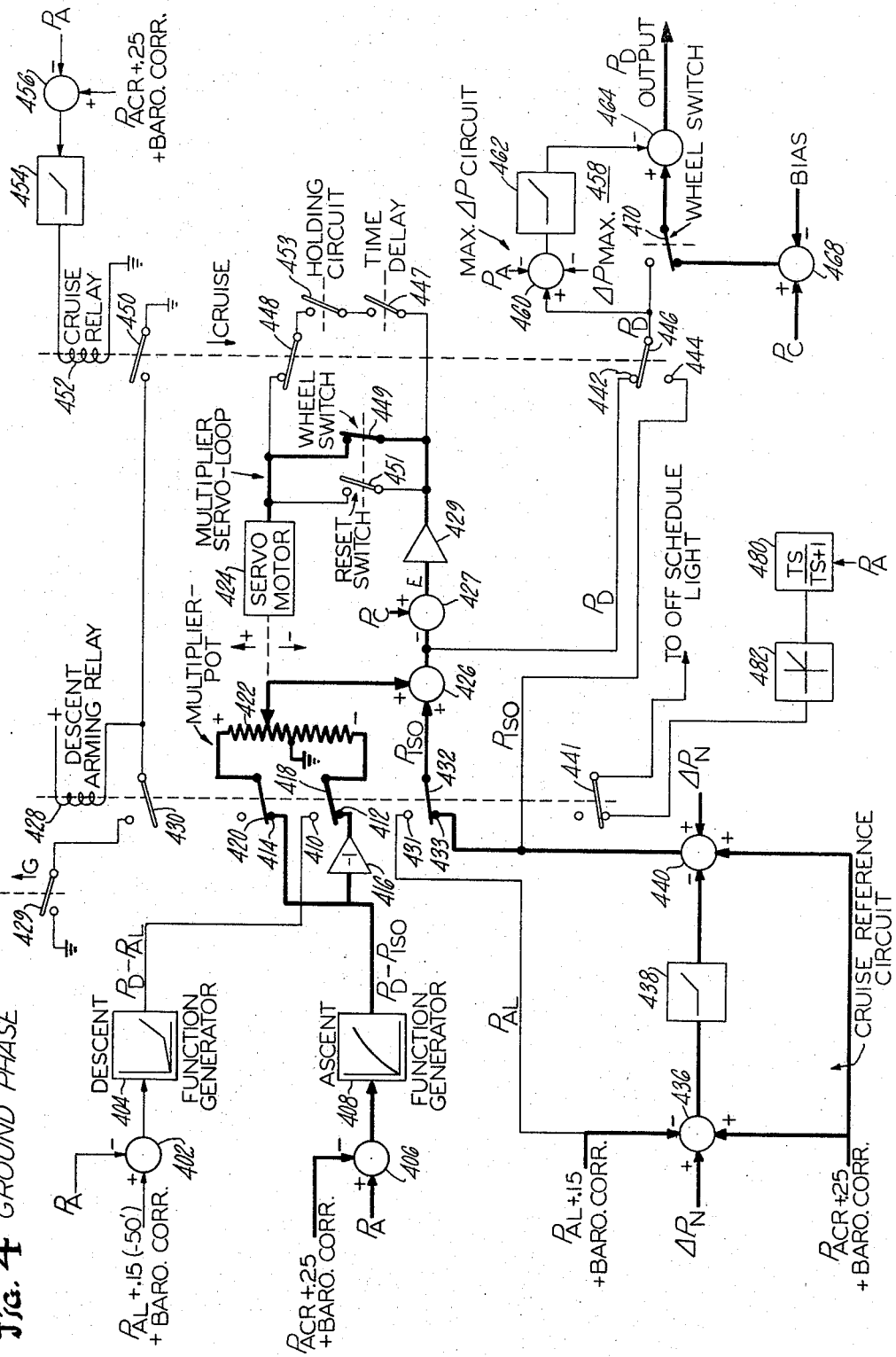
Figure 5:
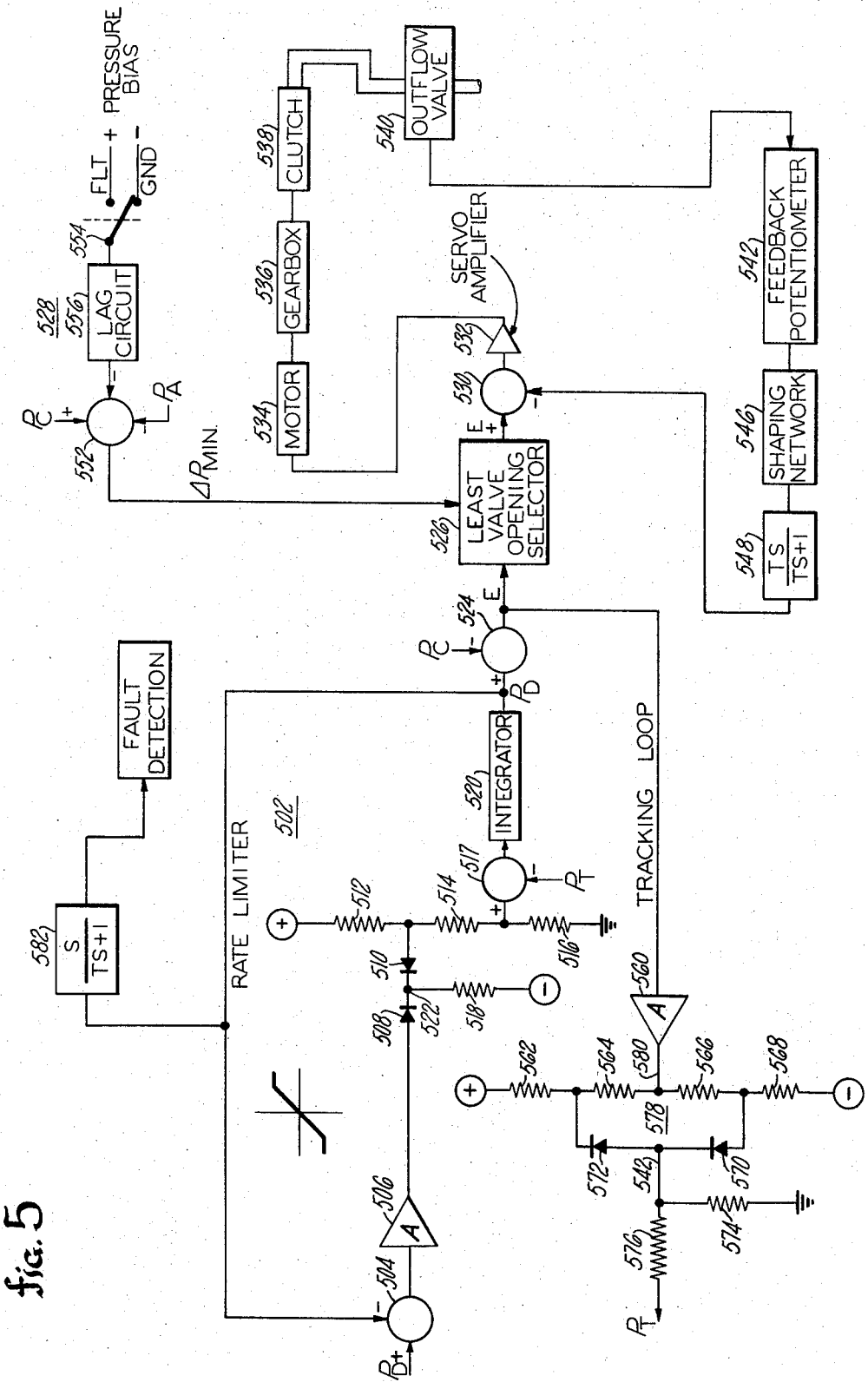

FIGURE 4 and FIGURE 5 together form a more detailed block diagram of the cabin pressure regulator and indicate by the heavier shading the signal flow in the schedule generator during the ground phase.

FIGURE 6 shows the schedule generator with the heavier shading indicating the signal flow during the ascent phase of the flight.

FIGURE 7 shows the schedule generator with the heavy shading indicating the signal flow during the cruise phase.

FIGURE 8 shows the schedule generator and the signal flow during the cruise phase including differential limiting.

FIGURE 9 shows the schedule generator and the heavy shading indicates the signal flow during the descent phase of the flight.

FIGURE 10 shows a family of curves obtained from the ascent function generator used in the schedule generator.

Figure 11:
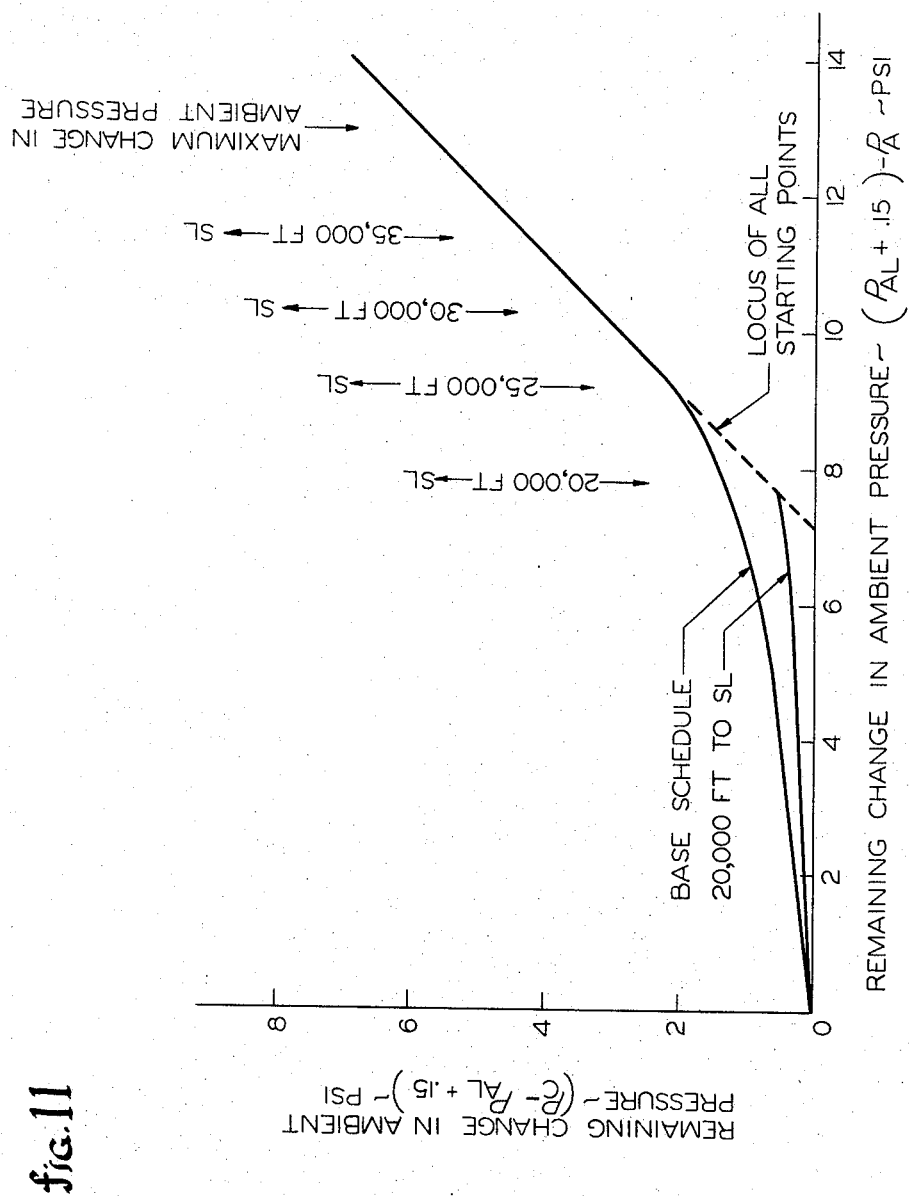

FIGURE 11 shows a family of curves obtained from the descent function generator used in the schedule generator.

FIGURE 12, which includes FIGURES 12a–12d, shows a circulaiity for performing analog logic functions such as summing, subtracting, and switching.

Figure 13:
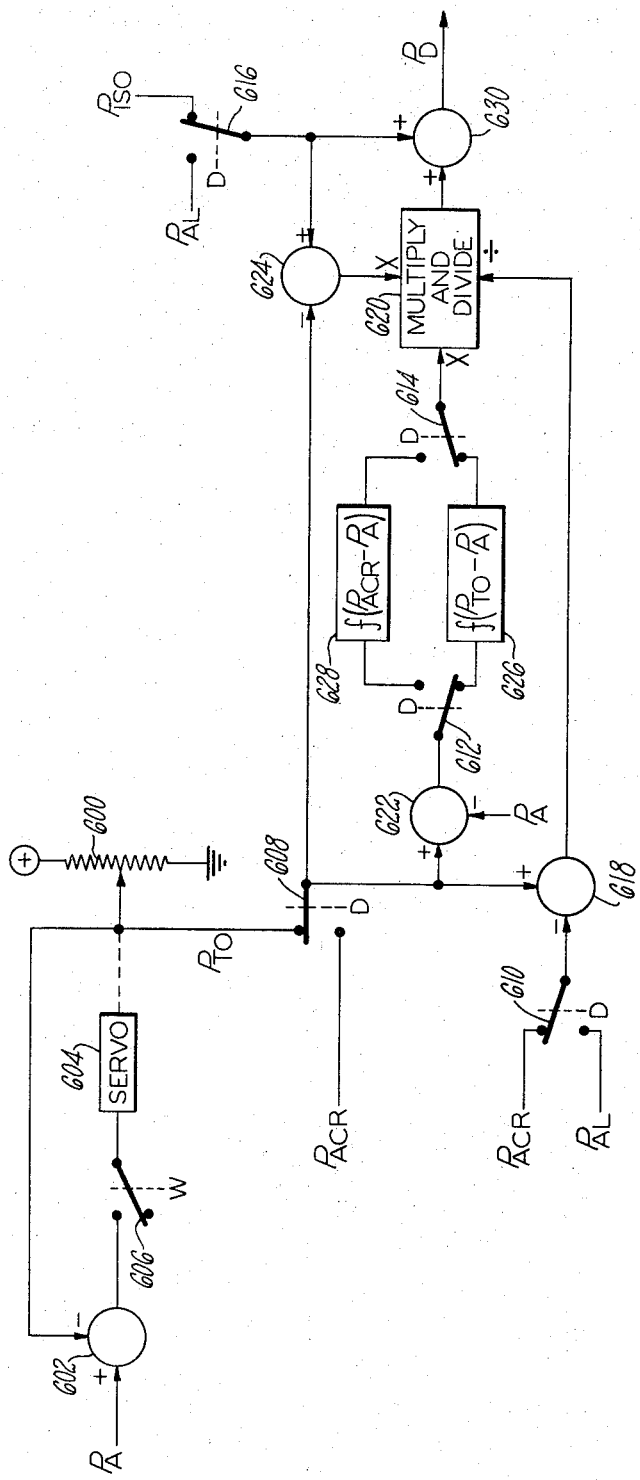

FIGURE 13 shows a schedule generator.

Figure 14:
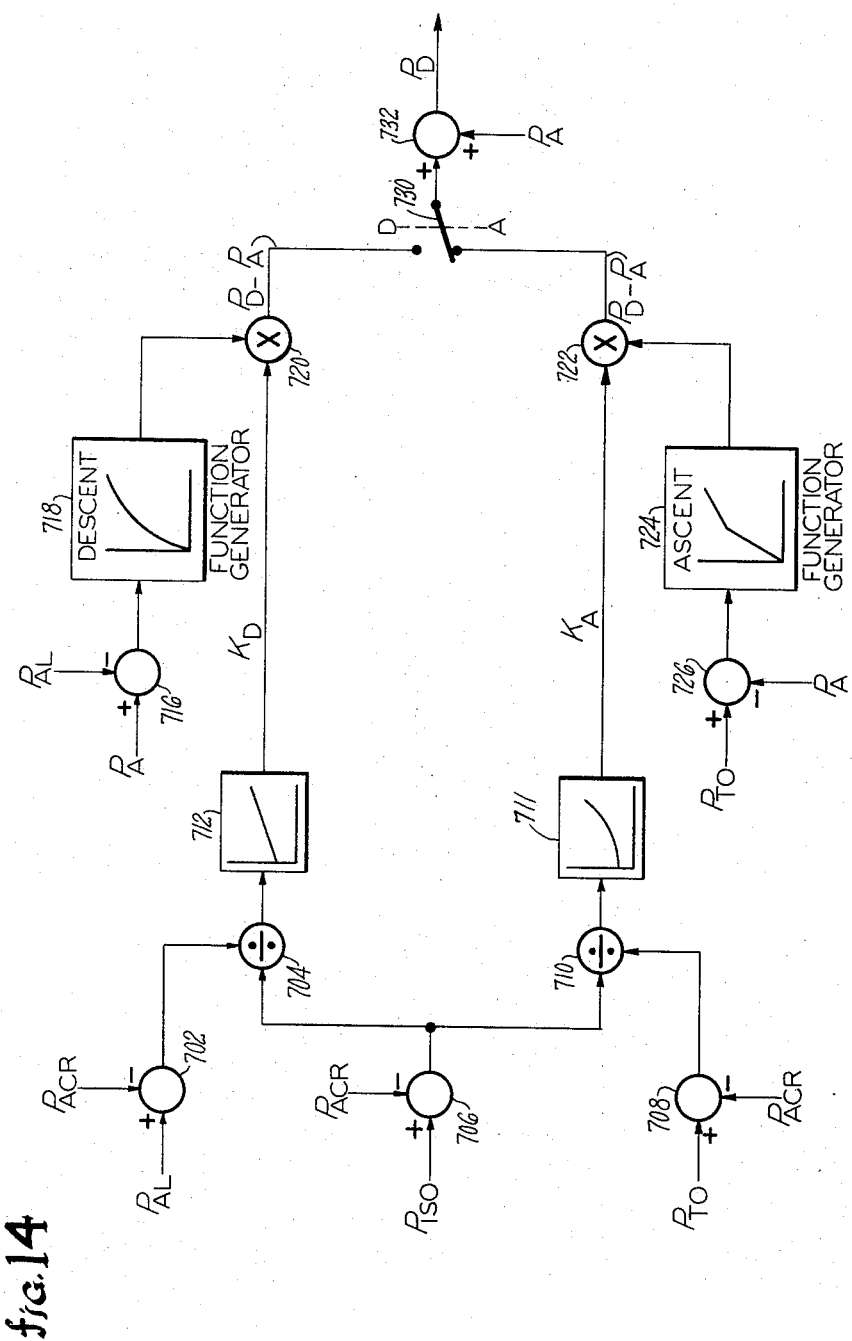

FIGURE 14 shows an alternate schedule generator.

To facilitate an understanding of the embodiment described herein, a table of the symbols and their description is shown below.

$P_c$=the signal indicative of the actual cabin pressure
$P_a$=the signal indicative of the ambient or external cabin pressure
$P_d$=the signal indicative of the desired cabin pressure
$P_{bar}$=the siganl indicative of the barometric correction
$P_{iso}$=the signal indicative of the desired cabin pressure during the cruise phase of the flight
$P_{al}$=represents the scheduled signal indicative of the external landing or destination pressure required in the cabin at the termination of the descent phase of the flight $P_{acr}$=represents the signal indicative of the scheduled ambient or external cabin pressure required at the end of the ascent phase and during the cruise phase of the flight $\Delta P_{max}$=represents the signal indicative of the maximum allowable differential between the ambient and cabin pressures $\Delta P_n$=represents a signal indicative of a maximum allowable differential that is somewhat less than $\Delta P_{max}$ $\Delta P_{min}$=represents a signal indicative of the minimum differential to be maintained while the craft is taxiing on the ground $\epsilon$=represents the signal indicative of the error between the desired cabin pressure signal and the actual cabin pressure signal D=represents the time the descent relay is energized $D_p$=represents the short time that the time-delay relay is energized at the beginning of the descent phase $C_r$=represents the time that the cruise relay is energized W=represents the times when the pressure on the wheel switch is removed or applied $P_{to}$=represents the takeoff pressure external and internal to the cabin prior to the ascent phase In the first embodiment described herein, a desired cabin pressure signal is generated for the ascent and descent flight phases. The signal is produced according to the following equations:

$$\text{Ascent } P_d = P_{iso} + \frac{P_{to} - P_{iso}}{P_{to} - P_{acr}} f(P_a - P_{acr})$$

$$\text{Decent } P_d = P_{al} + \frac{P_{iso} - P_{al}}{P_{acr} - P_{al}} f(P_a - P_{al})$$

where the functions correspond to the curves as shown in FIGURES 10 and 11.

Figure 2:
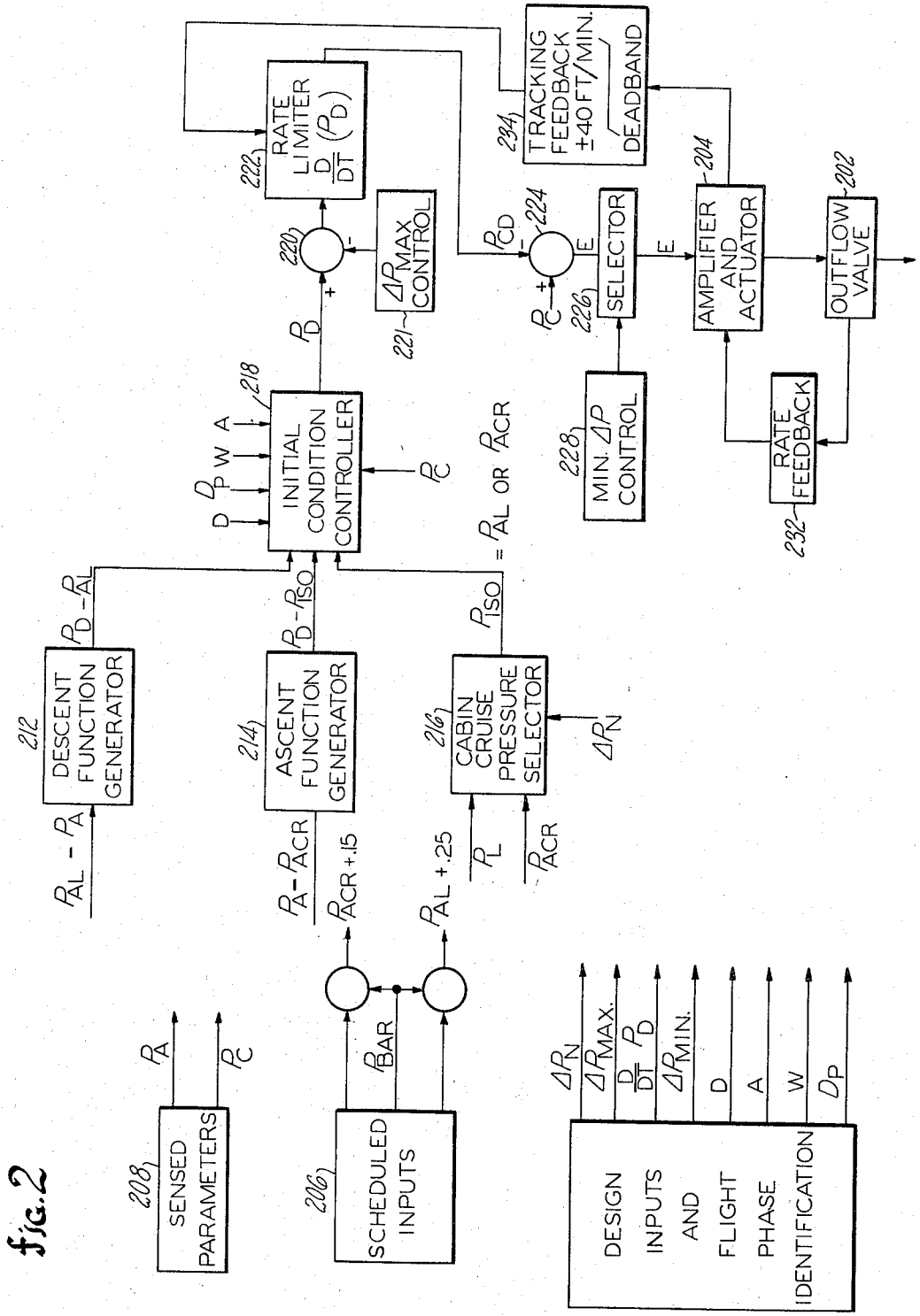
FIGURE 2 shows a block diagram of the broad system aspects of the embodiment of this invention.

The cabin pressure system shown in FIGURE 2 modulates a single thrust recovery outflow valve 202 driven by an electric actuator 204. Air to the cabin is supplied by two airconditioning packs (not shown) and is discharged through the outflow valve 202. The percentage of discharge air which flows through the outflow valve varies from almost 100% on the ground to as little as 10% during descent.

There are three scheduled signals which are used to pressurize the cabin throughout. These are: the entire flight of the aircraft cruise altitude $P_{acr}$, destination or landing altitude $P_{al}$, and a barometric correction signal $P_{bar}$. These scheduled inputs are provided from transducers in package 206.

The cabin pressure regulator utilizes two signals which represent sensed parameters: ambient or external cabin pressure signal $P_a$ and cabin pressure signal $P_c$. These parameters are sensed by conventional transducers in the package 208.

In addition there are a number of design inputs and flight phase identifiers needed to perform logic switching and which will vary with the different aircraft for which the cabin pressure regulator may be used. These inputs are fixed and do not vary once a particular control has been designed.

The $P_{al}$ as well as the $P_{acr}$ signals are barometrically corrected as is indicated in FIGURE 2. During the ascent and descent the control of the cabin pressure is accomplished by generating a change in cabin pressure signal as a function of the change in ambient pressures. Thus a $P_{al} - P_a$ signal is generated to drive a descent function generator 212 the output of which produces a signal indicative of the difference between $P_d$ and $P_{al}$. Similarly during the ascent of the aircraft the input of the ascent function generator 214 is $P_a - P_{acr}$ to produce an output signal which is indicative of the difference between the $P_d$ signal and $P_{iso}$. The function generators 212 and 214 produce output signals which bear a predetermined relationship to the input. The relationship is a proportionality constant and is such that when the aircraft reaches the termination of the particular flight phase, during which either of these function generators controls the cabin pressure, the cabin pressure will be at the nominal ambient to cabin differential, $\Delta P_n$. The scheduling minimizes the rate of cabin pressure changes regardless of how the airplane climbs or descends.

For the cruise phase the cabin pressure is scheduled according to $P_{iso}$. This signal represents the highest allowable cabin pressure. This would be either the $P_a - \Delta P_n$, or the landing field pressure $P_{al}$. The selective circuit 216 performs this selection.

The outputs from the function generators 212 and 214 together with the isobaric cabin pressure control signal $P_{iso}$ are fed to an initial condition control 218. Other inputs to the initial condition control are the actual cabin pressure signal $P_c$, the phase signals D, $D_p$, W, and A. The functions of the initial condition control are twofold, first to select in response to the phase signals which desired cabin pressure signal to present, and secondly to establish initial conditions for each flight phase depending upon the actual pressures existing at the commencement thereof. The output of the initial condition control 218 is a desired cabin pressure signal $P_d$ which is then passed through a network 220 which has an additional input from the $\Delta P_{max}$ circuit 221. Whenever there is a signal from the circuit 221 it overrides the desired cabin pressure with such a polarity and magnitude that it tends to reduce the cabin pressure and bring it within allowable differential limits. The $P_d$ signal is passed on to the rate limiter circuit 222, which acts on the desired cabin pressure signal to limit its rate of change to below a predesigned rate. This upper rate limit is established to assure passenger comfort during rapid changes in altitude of the aircraft. The output of the rate limiter is compared in network 224 to the actual cabin pressure signal $P_c$ and produces an error signal. The error signal together with a signal from the minimum $\Delta P$ control circuit, 228, are fed to a selector circuit 226. The selector passes on that signal calling for the highest pressure or lowest altitude. The $\Delta P_{min}$ signal is generated by a control network 228 and is only active when the aircraft is on the ground with the wheel switch closed. In the absence of any $\Delta P_{min}$ signal, the error $\epsilon$ is passed on through an amplifier and actuator 204 to the outflow valve 208. A rate feedback circuit 232 prevents runaway of the high gain amplifier 204. A signal indicative of the magnitude of the error signal $\epsilon$ is passed through a tracking feedback network 234 and fed back to some point within the rate limited circuit 222. The purpose of the tracking feedback signal will be described in more detail below.

SENSED PARAMETERS

Figure 3:
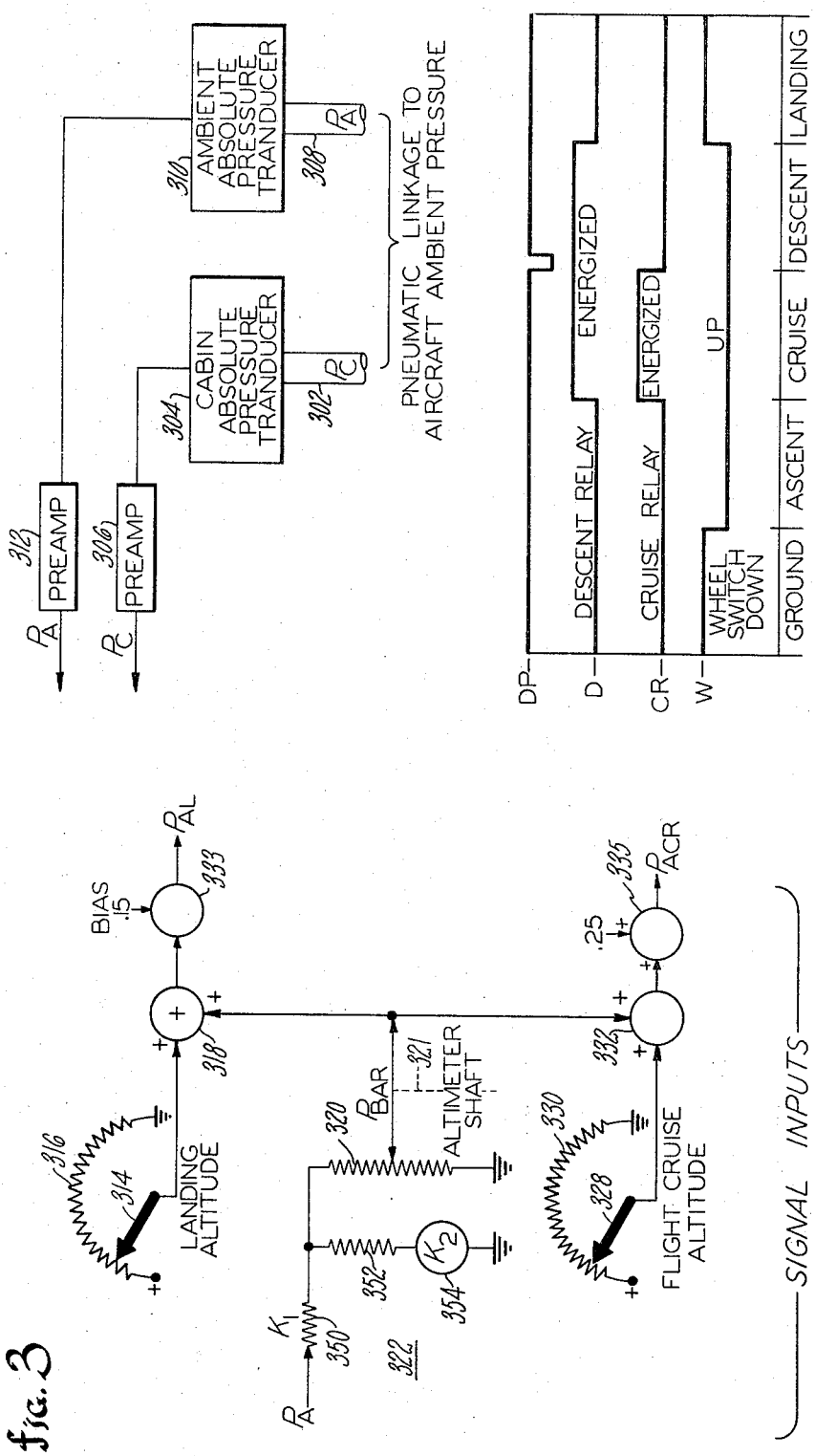
FIGURE 3 shows the barometric correction of input signals, the timing diagram of the relays used in the embodiment and the transducers for the sensed parameters.

There are two parameters which are sensed by transducers to produce electrical signals indicative thereof. These are cabin pressure and ambient or external cabin pressure. In FIGURE 3 the cabin pressure is sensed through port 302 and the electrical equivalent of the cabin pressure is produced by the transducer 304. The output of transducer 304 feeds a preamplifier 306 to produce an output signal of sufficient strength to drive necessary circuitry in the cabin pressure regulator. Similarly the ambient pressure is sensed through a port 308 and an electrical equivalent of the ambient pressure is produced at the output of pressure transducer 310. Again a preamplifier 312 provides an electrical ambinet signal $P_a$ to drive the associated networks and the cabin pressure regulator. For accurate performance the transducers are placed in an oven (not shown) which is maintained at a constant temperature to produce true electrical equivalents of the sensed parameters.

SCHEDULED PARAMETERS

There are three scheduled parameters: flight cruise altitude, landing altitude, and the barometric correction. FIGURE 3 shows the implementation of these scheduled inputs. The inputs are in altitude rather than pressure signals so that a conversion to pressure must be made automatically. The landing altitude potentiometer is located in the cockpit on a panel and represents a dial which varies the wiper 314 on a nonlinear variable resistor 316. A voltage is applied across the fixed terminals of the resistor 316 to provide an electrical signal indicative of the selected or scheduled landing field pressure. Since the absolute altitude varies nonlinearly with the pressure the nonlinearity of the variable resistor 316 corrects this and provides a signal indicative of the pressure at the destination or landing point. This signal is then further corrected for barometric variations in the summing network 318. The output of this network 318 produces a signal indicative of the actual pressure at the landing or destination field, $P_{al}$.

The flight cruise altitude is scheduled by the pilot by adjusting the wiper 328 of the variable nonlinear resistor 330. The resistor 330 has a fixed potential placed across it so that the wiper produces an output signal indicative of the ambient pressure during the cruise phase of the flight. This signal is then added to the barometric correction signal in the network 332 to produce the $P_{acr}$ cruise external cabin pressure signal.

The barometric correction signal is derived from a circuit 322 that is coupled to the altimeter shaft 321 located in the cockpit. The rotation of the shaft is indicative of the barometric correction in altitude, $\Delta H$.

A pressure signal $P_a$, indicative of the pressure level for which the barometric correction is to be made is connected through a computation network including resistors 350, 352, and bias 354 to excite the fixed terminals of variable resistors 320. The wiper of resistor 320 is mechanically coupled to the shaft 321.

The computation circuit 322 produces a signal indicative of the density of the atmosphere at the pressure level represented by $P_a$. Density is related to pressure by $$\rho = K_1 P_a + K_2 \text{ where } K_1 = 3.17 \times 10^{-5}$$

and $K_2 = 7.2 \times 10^{-5}$. Since the sea level barometric altitude variation is the same at all higher altitudes of interest one may then compute the pressure variation at any altitude by assuming $$\Delta P = \Delta H \rho$$

so that $$\Delta P = [(3.17 P_a + 7.2) 10^{-5}] \Delta H$$

Hence by exciting the potentiometer 320 with the density corresponding to the pressure level at which a correction is to be made the $P_{bar}$ signal is obtained to correct $P_{acr}$ and $P_{al}$.

A small bias signal indicative of .15 p.s.i. is added to the $P_{al}$ signal in circuit 333 and a small bias of .25 p.s.i. is added to the $P_{acr}$ signal in circuit 335. The purposes of these biases will be explained in connection with the other figures.

A further description of a barometric correction scheme as heretofore described may be found in a copending application by Stanley G. Best, Serial No. 564,226, filed July 11, 1966, entitled "Electronic Schedule Generator Tracking Circuit" and assigned to the same assignee.

FIGURE 3 also shows the phase identifying functions produced by relays that are energized at proper times. The wheel switch responsive to the loading or unloading of the wheels produces a signal W. It effectively closes when the wheels are under pressure on the ground or during taxiing and landing operations but is open during ascent, cruise and descent phases. The cruise relay producing a CR signal is energized upon the detection of an ambient pressure signal, $P_a$ substantially equal to the $P_{acr}$ signal. It remains energized during the existance of this condition and is deenergized when the ambient pressure rises above a predetermined limit over the scheduled ambient pressure signal. At the same time that the cruise relay is energized, the descent relay indicated by D is energized and since this is a holding relay it is not deenergized upon the deenergization of the cruise relay and is maintained in the energized condition throughout the descent phase and until the landing of the craft. In addition a $D_p$ signal is produced by a time delay which is energized for a short time period upon the termination of the cruise phase of the flight.

SCHEDULE GENERATOR

FIGURE 4 together with FIGURE 5 provide a more detailed view of the cabin pressure regulator and with the heavier shading indicate the signal flow during the ground phase prior to take off of the airplane. The schedule generator schedules the cabin pressure as a function of the ambient pressure. For ascent this means scheduling $P_d - P_{iso}$ as a function of $P_a - P_{acr}$ and for descent scheduling $P_d - P_{al}$ as a function of $P_a - P_{al}$. Each schedule starts at a finite value and ends at a minimum or zero. With this type of a schedule the actual conditions prior to ascent and descent can be sensed and a servo loop may be closed on the function generators used in the schedule generator to force the schedule to initially match the actual conditions existing at the commencement of a flight phase. The servo loop is closed on the schedule generator by a multiplier which multiplies the $P_d - P_{iso}$ and $P_d - P_{al}$ signal until the desired cabin pressure signal $P_d$ substantially matches the sensed $P_c$ signal. This approach enhances the ability of the system to start the automatic scheduling of cabin pressure promptly. Once the schedule generator has been matched to the initial conditions it will drive the difference signals towards a minimum.

In FIGURE 4, $P_a$ is subtracted from $P_{al}$ in network 402 and the difference applied to the descent function generator 404. Descent function generator 404 produces an output signal indicative of the difference between the desired cabin pressure and $P_{al}$, the desired final value cabin pressure at the end of the descent phase. For ascent $P_{acr}$ is subtracted from $P_a$ in network 406 and this is applied to the ascent function generator 408 to produce the $P_d - P_{iso}$ difference signal. The output of the function generators 404 and 408 are applied to two doubles-throw single-pole switches 418 and 420. $P_d - P_{iso}$ is applied directly to the terminal 414 and through an inversion amplifier 416 to the terminal 412. The $P_d - P_{al}$ signal is applied to the opposite terminal 410 of the switch 418. The poles of the two switches are then connected across the fixed terminals of a multiplier resistor 422. The wiper of the potentiometer is mechanically connected to a servomotor 424 and electrically connected to the summing circuit 426. The switches 420 and 418 are open and closed by the rescent arming relay 428 which is shown in its unenergized condition.

The descent relay 428 also controls the single-pole single-throw switch 430 and the two double-throw single-pole switches 432 and 441.

The $P_{iso}$ signal is generated by applying the $P_{al}$ signal to the network 436 together with the $\Delta P_n$ and $P_{acr}$ signal to produce an optimum signal which is the sum of $P_{acr} + \Delta P_n - P_{al}$. This signal is then applied to analog switch network 438 which produces an output when $P_{acr} + \Delta P_n$ is greater than $P_{al}$. The output of switch network 438 is then applied to the substracting input of the network 440 to which are also applied $P_{acr}$ and $\Delta P_n$. In summary just prior to take off or during reset $P_{iso}$ may have either of two values depending upon the initial conditions and the relative values of $P_{acr}$ and $P_{al}$. This relationship may be described according to the following two formulas:

$P_{iso} = P_{al}$ when $P_{acr} + \Delta P_n$ is greater than $P_{al}$ $P_{iso} = P_{acr} + \Delta P_n$ when $P_{al}$ is greater than $P_{acr} + \Delta P_n$ The purpose of this selection circuit is to maintain the cabin pressure during the cruising phase of the flight to as low an altitude or as high a pressure as is possible. Thus for flights which would not exceed approximately 18,000 feet the cabin pressure can be driven towards or held at the landing pressure if the proper condition exists at the commencement or with reset during the flight.

The terminals 431 and 433 of switch 432 are respectively connected to $P_{a1}$ and $P_{iso}$. The pole is connected to the summing network 426.

Since the output from the wiper on the variable resistor 422 represents a difference signal and the summing network 426 adds two signals together the output from this network is the desired cabin pressure signal $P_d$. The $P_d$ signal is then applied together with the $P_{iso}$ signals to the terminals 442 and 444 of the double-throw single-pole switch 446. The switch 446 as well as the single-throw single-pole switches 448 and 450 are controlled by the cruise relay 452 which in turn is energized by an analog switch circuit 454. This last circuit produces an output when the $P_a$ signal connected to the summing network 456 represents an ambient pressure which is less than the pressure represented by the $P_{acr}$ signal. In order to provide an operating range in the cruise phase a predetermined bias of .25 p.s.i. is added to the $P_{acr}$ signal as shown in FIGURE 3 so that the cruise relay is energized some time prior to the aircraft actually reaching the scheduled cruise altitude to some extent without dropping out of the cruise phase. The switches controlled by the cruise relay are shown in FIGURE 4 for the ground phase of the flight.

The pole of switch 446 is connected to a maximum $\Delta P$ circuit generally indicated at 458. The purpose of this circuit is to override the desired cabin pressure signal in the event the pressure differential between the ambient and the cabin exceeds a predetermined maximum indicated by $\Delta_{max}$. The $P_{max}$ signal as well as the $\Delta P_n$ signal are generated from standard reference circuits providing stable voltage levels indicative of these differential pressures. The $\Delta P_n$ differential is somewhat less than the $\Delta P_{max}$.

The $P_d$ signal is applied to a summing network 460 to which also are applied $P_a$ and $\Delta P_{max}$ to provide together with the selector circuit 462 an output when $\Delta P_{max}+P_a$ are less than $P_d$. The output of the selector circuit 462 is substracted from the $P_d$ signal in network 464 so that the net effect of the maximum $\Delta P$ circuit is to reduce the desired cabin pressure signal by an amount necessary to bring it within the maximum permissible differential pressure.

In between the switch 446 and the subtracting network 464 is the double-throw single-pole switch 470 actuated in response to the wheel switch position. The pole is connected to the network 464 and one of the terminals to the $P_d$ signal from switch 446. The other terminal is connected to a subtracting network 468 wherein a small bias signal representing approximately 50 feet of altitude above sea level is subtracted from the cabin pressure signal $P_c$. The purpose of this negative bias is to drive the outflow valve open in the absence of any other signal into the cabin pressure control and would be active when the plane is on the ground and near the terminal.

The $P_d$ signal from the FIGURE 4 is applied to the rate limiter circuit generally indicated at 502 in FIGURE 5. It enters the summing network 504 and is applied through an amplifier 506 through a network comprising series diodes 508 and 510 and resistor network 512, 514, 516 and 518 and through a difference network 517 to an integrator 520. The output of the integrator 520 is negatively fed back to the summing network 504. Resistor 512 is connected to a positive supply and resistor 518 to a negative supply.

The rate limiter operates as follows. The amplifier 506 has a very high gain so that its output will saturate with low level $P_d$ signals. The bias developed at the common cathode point 522 is held at ground with a zero signal into amplifier 506. With zero $P_d$ signal, diodes 508 and 510 are conducting and the signal into integrator 520 is effectively zero. The amplifier gain is adjusted so that it will saturate with a ($P_d$—integrator feedback signal) equivalent to 500 feet of sea level pressure. Below 500 feet the amplifier output is linear. When the output from the amplifier 506 rises quickly to a high value, for instance, positively, the common point 522 becomes positive and effectively cuts off the conduction through diode 510. The input to the integrator 520 thereby rises sharply and the integrator output commences to increase in a positive direction and linearly in accordance to a predetermined slope. The integrator rise is controlled according to standard integrating circuitry techniques and is made to correspond to the desired permissible rate for passenger comfort which may be set for a 500 sea level feet (.265 pounds per square inch per minute) rate of increase or decrease. As the output of the integrator increases at this rate, the negative feedback at summing circuit 504 bucks the input $P_d$ signals and drives the input to amplifier 506 to zero after a sufficient time has lapsed so that the common point 522 again becomes balanced at ground potential. Similarly, if there is a reduction at the output of amplifier 506 the diode 508 is reverse biased and diode 510 is conducting. Again, a step input, but negative, is presented to the integrator 520 which begins to integrate the input at the predetermined rate and continues to do so until the common point 522 again is balanced.

The output from the integrator is the rate limited $P_d$ signal which is thereupon compared to the cabin pressure signal $P_c$ to produce an error signal $\epsilon$ at the output of the summing network 524. The error signal passes through a selector network 526 which has another input from a minimum $\Delta P$ circuit generally indicated at 528. The selector 526 passes the signal calling for the least valve opening to the summing network 530 which thereupon passes the signal out to the servo amplifier 532. The servo group controlling the outflow valve 540 includes an AC servo actuator 534, a gear box 536 and a clutch 538 with a rate feedback loop consisting of a feedback potentiometer 542, a shaping network 546 and a derivative and lag circuit 548. When an error signal is passed by the selective circuit 526, it is amplified by the servo amplifier 532 which provides the power to the control winding of the AC servo actuator 534. The actuator 534 reference winding is powered at all times. In the event the reference winding power is interrupted, a break in the AC servomotor holds the motor in position. The actuator output drives the outflow valve through a clutch which is spring loaded so that in the absence of any power it is normally engaged.

The gain in the servo amplifier 532 is sufficiently high so that full torque will be applied to the load by the actuator 534 with a 10-foot error signal from the selector circuit 526. This high forward gain is balanced by the feedback signal generated by the potentiometer 542 and a derivitive circuit. When an error signal is applied, the high gain of the servo amplifier 532 will allow the friction to be overcome with a very low (approximately 4 feet) error signal. Once the load starts moving, however, the feedback signal will prevent the high forward gain from driving the system unstable. The purpose of the shaping network 548 is to vary the feedback in order to keep the total servo loop gain relatively constant for variable outflow valve positions. The control loop is an integral rather than proportional control so that there is no steady state error or droop as a function of the valve position.

The lag in the circuit 548 compensates for the double integration formed by cabin and servo loop. The lag becomes a lead cancelling one of the integrators at a frequency which is less than the crossover frequency of the cabin and servo loop.

The minimum $\Delta P$ signal was obtained from the minimum $\Delta P$ differential pressure control 528. This circuit consists of a comparison circuit 552. The comparison circuit 552 compares the sensed cabin pressure $P_c$, ambient pressure $P_a$ and a reference derived from a bias source (not shown) through switch 554 and lag circuit 556. The value of the bias is determined by the position of the flight ground switch 554. In the ground position the reference is +.1 p.s.i. and in the flight position it is −.1 p.s.i. These values are equivalent to approximately 200 feet in altitude. In the flight position of switch 554 the purpose of the $\Delta P_{min}$ signal is to provide an error signal that calls for a pressurization in the cabin pressure of at least 200 feet below ground or −.1 p.s.i. and requires a closed valve 540 to accomplish this. In the event the switch 554 is in the ground position the $\Delta P_{min}$ signal is effectively excluded from the cabin pressure control since the $\Delta P_{min}$ signal now calls for a plus 200 feet in altitude signal. Since the network 468 in FIGURE 4 in combination with the wheel switch 466 produces a signal calling for a plus 50 feet cabin pressure the latter signal will be selected by the selector 526 and allow the cabin pressure to be maintained during ground operations at approximately plus 50 feet. The switch 554 is generally in the ground position near the terminal and in the flight position at all other times. The purpose of the lag circuit 556 is to delay the effect of transitions of the switch 554 and smooth out any transients that may be caused by changing its position. During flight the minimum $\Delta P$ circuit assures that the error signal will never be allowed to require a valve opening calling for a greater pressure change than .1 p.s.i.

During idle descents it is possible for the engines to be incapable of supplying the air called for by the increasing desired cabin pressure signal. As a result, the actual cabin pressure remains at a lower pressure than the desired pressure signal even though the error from the network 524 calls for an almost fully closed valve. If thereupon the engines are accelerated towards at least partial power generation the inflow of the air will be of such an amount that the cabin pressure tends to rise very suddenly at the maximum rate which is unpleasant to the passengers.

A tracking loop circuit is provided and senses a signal indicative of the error between the $P_d$ and $P_c$ signals. This signal may be either taken from the output of network 524 or from the servo amplifier after the rate feedback has been introduced in the loop at network 530. The signal for the tracking loop is fed through an amplifier 560 which has at its output a discriminating network generally indicated at 578. The network together with the amplifier produces an output whenever the error signal represents a deviation between $P_d$ and $P_c$ larger than 40 feet. It will not provide an output as long as the error signal is less than that. This is accomplished by providing a symmetrical resistor network between the positive and negative supply, including similar resistors 562 and 568 and similar resistors 564 and 566. All these resistors are connected in series between the supplies as shown in FIGURE 5. A pair of series connected diodes 570 and 572 are connected in parallel across resistors 564 and 566 with the cathode of diode 572 connected to the common point between resistors 562 and 564 and the anode of diodes 570 connected to the common point between resistors 566 and 568. The output of this network is taken from the common point between the series connected diodes and fed through a voltage divider network consisting of resistors 574 and 576 to the difference circuit 517.

In the absence of an output from amplifier 560, the voltage at the output 578 is at ground potential. Hence the diodes 572 and 570 are reverse biased. The point 582 is therefore also at ground level and provides a zero signal into the network 517. Whenever a signal into the amplifier 560 exceeds 40 feet, the common point 580 either rises positively or drops negatively depending upon the polarity of the error. If the point 580 goes positive the diode 572 becomes more reverse biased but the diode 570 will become forwardly biased and drive the point 580 positive. Network 517 is thus provided with a feedback signal tending to force the $P_d$ signal to follow the actual cabin pressure. The amount of signal required at the output of amplifier 560 to overcome the deadband of the circuit 578 is determined by the relative values of the series resistors 562, 564, 566 and 568 as well as the potentials needed to forwardly bias the diodes 570 and 572.

A fault detection circuit is supplied by monitoring the feedback in the rate limiter circuit and applying this through a smoothing circuit 582 to a detection circuit. A fault is detected whenever the feedback signal exceeds a rate feedback in excess of a predetermined amount and for a time period substantially lower than what would be normally expected to occur for the various flight phases. The fault detection circuit produces an output when the input exceeds a predetermined maximum and the smoothing circuit 582 assures that momentary excesses of rate feedback do not trigger the fault detection circuit.

Before commencing with the explanation of the operation of the cabin pressure regulator in its various phases it would be advantageous to understand the operation of the basic analog logic modules employed.

In FIGURE 12 a linear amplifier 130 having a high open loop gain characteristic is shown provided with a positive input 132 and a negative input 134. The output 136 is connected to an anode of a diode 138. The cathode of the diode 138 is fed back through a resistor 142 to the positive input 132. The base of a transistor 144 is connected to the output 136 and the emitter is connected to the cathode of diode 138, the collector is connected to one terminal of a single-throw single-pole switch 146. The switch is shown closed and connected to ground although it may be connected to any potentials. The transistor is of the PNP type. In addition, the inputs 132 and 134 are coupled through resistors 148 and 150 to the respective signal inputs and other inputs may be provided as shown. FIGURE 12b indicates the performance of the circuit shown in FIGURE 12a as the input signal varies from a negative value to a positive value. The output signal, $V_o$, taken from the emitter of transistor 144 is shown as the ordinate in FIGURE 12b.

With the collector of 144 connected to ground and the input signal 134 also held at ground potential then as the input signal to the 132 input proceeds from a negative value the output of the amplifier 130 cannot go negative because transistor 144 conducts. A negative input 132 will drive transistor 144 into saturation so that the output will be essentially at ground but for the small emitter-to-collector potential drop. As the input signal proceeds toward the positive region, the output 136 will go positive and the transistor 144 will be cut off to permit the output signal $V_o$ to follow output 136. The resistor 142 determines the linear gain characteristic of the operational amplifier 130.

FIGURE 12c shows a similar circuit as in FIGURE 12a with the diode 138 replaced with a NPN transistor 152 whose collector is connected through switch 154 to a point having any desirable potential. The base of transistor 152 is connected to the output 136 and the emitter of 152 is connected to the emitter of transistor 144 and the output $V_o$. The performance of FIGURE 12c is shown to be linear in FIGURE 12d as the input signal at 132 proceeds from a negative value to a positive value. This is possible as long as the switches 146 and 154 are either connected to a sufficiently negative or positive voltage respectively or are open to leave the collectors floating.

The operations shown in FIGURES 12b and 12d can, of course, be altered by connecting the collectors to different voltage sources or applying the $V_{in}$ signal to the negative input 134. The switches may, of course, be eliminated. However, for the purposes of explanation of the cabin pressure regulator, these two logic functions suffice. It should also be realized that a multitude of input signals can be applied to the inputs 132 and 134 and the input 134 need not be grounded where the output from the operational amplifier is desired to be the difference between the two signals.

GROUND PHASE OPERATIONS

With the aircraft on the ground, the wheel switch 464 will switch the schedule generator output $P_d$ to a signal indicative of the sensed cabin pressure minus a bias from the network 468. Since this signal calls for a plus 50 feet altitude in the cabin pressure it holds the outflow valve open provided the ground flight switch 554 shown in FIGURE 5 is in the ground position and calling for a plus 200 feet error signal. This condition will generally prevail when the aircraft is near the loading terminal. The signal flow is from the network 468 through the rate limiter to the servo amplifier and the outflow valve and holds the latter open. In the event the flight ground switch 554 is switched to the flight position bias signal provided by this switch calls for a smaller valve opening and will therefore control the outflow valve through the selector circuit 526.

During the ground phase all switches are positioned as shown in FIGURE 4 and the schedule generator is continually active in preparing the initial conditions for the subsequent ascent phase. With the plane on the ground, the pressure on the wheels forces the wheel switch 429 to be open and the single-pole double-throw wheel switch 449 to be closed. The output of the ascent function generator 408 is applied to the multiplier potentiometer 412 and it is reciprocal to the other side of the potentiometer. The potentiometer wiper output signal representing $P_d - P_{iso}$ will be summed with $P_{iso}$ giving a resultant signal on the output of network 426, $P_d$. This signal is then compared in network 427 to the actual cabin pressure signal $P_c$ to produce an error signal which is amplified in amplifier 429 and applied through switch 449 to the servomotor 424. The polarity and magnitude of the output of amplifier 429 is such that the wiper of the potentiometer 422 is moved in a direction tending to minimize the difference between the $P_d$ and $P_c$ signal and thus reduce the error essentially to zero. As the $P_{acr}$ signal is scheduled into the cabin pressure control, the $P_{iso}$ signal may vary and correspondingly alter the $P_d$ signal automatically. As soon as the aircraft leaves the ground and removes the pressure from the wheels, the wheel switch 449 will open and the servo loop is broken with the desired cabin pressure being matched to the actual conditions existing at the time of takeoff of the craft.

ASCENT PHASE

The removal of the pressure from the wheels causes the wheel switch 429 to close and the wheel switch 470 to disengage from the bias network 468 and connect to the output of the switch 446. As the aircraft starts to climb, the $P_d$ signal from network 426 will control the cabin pressure regulator and since this signal was initially matched to the actual cabin pressure $P_d$ the transition is smooth.

As the aircraft climbs $P_a$ decreases thus decreasing the input to the function generator 408 and decreasing the function generator output $P_d - P_{iso}$. As the scheduled cruise altitude is approached, the potentiometer output on the wiper is diminished to essentially zero leaving $P_{iso}$ effectively as the desired cabin pressure signal $P_d$.

In the event that the flight must be aborted and the aircraft returned to the takeoff field, the system will automatically return the cabin pressure to that existing at the takeoff field without any action on the part of the crew. In such a case, the cabin pressure follows the climb schedule in reverse.

In the event a change in the cruise altitude of the aircraft is made during climb, i.e., $P_{acr}$, the servo loop may be closed temporarily through the reset switch 451. This will cause the multiplier to run in order to get $P_d$ again equal to the actual $P_c$ signal. Since the cabin pressure is controlled by the schedule generator and the servo is attempting to set $P_d$ to match $P_c$, the cabin pressure will tend to provide a positive feedback causing the cabin pressure to become unstable. This system is prevented from running away by the rate limiter circuit so that during the reset period the cabin pressure will be, at most, changing at the rate limit of 500 feet per minute. The reset should not take more than 10 seconds so that the maximum change during this time would not be greater than 100 feet.

Reference is made to FIGURE 10 where the change in desired cabin pressure is plotted as a function of the scheduled change in ambient pressure, i.e., $P_a - P_{acr}$. This is plotted for several climb cases depending upon the scheduled cruising altitude of the airplane. The maximum change in cabin pressure would occur for a case where the takeoff altitude is minus 1,000 feet and the cruise altitude is planned for 42,000 feet. This basic maximum schedule is selectively attenuated to provide all schedules for all other ascents and the attenuation is accomplished through the multiplier potentiometer 442. The line bounding the right of the schedule defines the start for all the schedules so that the other schedules are obtained by multiplying with a factor of less than unity. In this manner an infinite family of schedules is available to suit any selected cruising altitude.

The schedule is intended to vary the cabin pressure at a steady rate and relies upon the most probable aircraft climb profile to determine the required nonlinearity of the function generator.

The ascent function generation uses straight-line approximations to obtain the desired shape of the schedule of FIGURE 10. Two breakpoints at the output of an operational amplifier responsive to $P_a - P_{acr}$ occur at about the 2 p.s.i. and 6 p.s.i. values of the input function. Conventional diode function generator techniques are used in which two diodes connected to the amplifier output are supplied with different biases corresponding to the desired breakpoints.

The multiplier factor is generated by sensing the maximum scheduled change in the ambient pressure, $\Delta P_{a_{max}}$ and the maximum anticipated change in the desired cabin pressure. $\Delta P_{d_{max}}$. The ratio $\Delta P_{d_{max}} / \Delta P_{a_{max}}$ will determine the magnitude of the multiplier factor applied by the potentiometer 422.

Whereas the function generator takes into account the nonlinearity between the change in the ambient pressure and the change in the desired cabin pressure, the multiplier factor corrects for the different types of schedules needed for different flight modes.

In the event the aircraft takes off from a field located at, for instance, 5,000 feet and is intended to fly at about 18,000 feet to land at an airport located at sea level, the cabin pressure instead of decreasing as the aircraft climbs will be increasing towards that at the intended landing field and for this reason also the inverse of the ascent function generator output is applied to the potentiometer 422.

For the operation of the reset featuring during ascent see FIGURE 11. Assume that the flight commences at sea level and that the $P_{acr}$ signal is set for 35,000 feet. At 4,300 feet or a change of 2 p.s.i. from sea level corresponding to point A, the $P_{acr}$ signal is changed to 30,000 feet. Since the original flight schedule was set for 35,000 feet and the multiplier has not altered its position for the new cruising altitude, the alteration of the $P_{acr}$ signal has the effect of moving along the original schedule a distance equivalent to the change in ambient pressure from 35,000 to 30,000 feet, i.e., towards point B. The projection of the change from A to B onto the desired cabin pressure change ordinate shows that the alteration jumps the desired cabin pressure signal $P_d$ from 14.45 p.s.i. or 400 feet to 15.1 p.s.i. or −730 feet. If the schedule is not reset the effect would be to cause the cabin pressure to stop decreasing as the craft ascends and momentarily, in fact, increase until the desired cabin pressure again matches the actual cabin pressure. This would cause a delay in the climb of the cabin pressure.

By closing the recess switch 451 a new schedule is started at point D for a $P_{acr}$ signal equivalent to 30,000 feet. Conversely, assuming that a change in the $P_{acr}$ signal is made at 4,300 feet from 35,000 to 40,000 feet, than a new schedule may be started for point E.

CRUISE PHASE OPERATION

As the aircraft continues to climb and the ambient signal $P_a$ approaches to within a .25 p.s.i. of the $P_{acr}$ setting, the output of the switch circuit 454 will energize the cruise relay 452. This causes the switch 450 to close, switch 448 to open and switch 446 to select $P_{iso}$ for the desired cabin pressure signal $P_d$. The closing of the switch 450 arms the descent relay 428 which causes switch 430 to close, 420 to connect to the open terminal, 418 to connect to the terminal 410, switch 432 to connect to terminal 431 or the $P_{al}$ signal and the switches 453 and 447 to close.

Since the descent function generator output $P_d-P_{al}$ is always negative or zero there is no need to use the inverting amplifier 416 and the signal is coupled to the negative side of the potentiometer 422 to provide a positive signal into network 426.

A .25 p.s.i. tolerance band has been established on reaching the selected cruise altitude. This will allow for errors in the system, the aircraft altimeter and pilot error. In the event that the cruise altitude is not reached and neither the cruise nor the descent relays have been energized, it is possible that a descent could be made without being in the descent phase. Consequently, a warning circuit has been provided to sense an increasing rate of change of ambient pressure signal, $P_a$ to operate a light and warn the pilot that an "off-schedule" descent is occurring. This is accomplished by applying the $P_a$ signal to a smoothing circuit 480 and then to logic circuit 482 which does not provide an output as long as its input is negative. As soon as the input becomes positive an output signal is generated to turn on the OFF schedule light (not shown). As soon as the descent relay is energized, the need for this circuit has been eliminated and this is accomplished by opening the switch 441.

In the event $P_{acr}$ is reselected to a higher altitude during the cruise phase, the cruise relay 452 will deenergize and the system operation will be like a descent mode. That is, the time delay switch 541 and the holding relay 449 will close to run the servo for approximately the time of the delay relay, i.e., three seconds. The descent schedule will then be in control and the subsequent climb to the higher altitude will be on the descent schedule until the new cruise altitude is reached. The cruise relay will then become energized again to allow the system to operate in the normal cruise phase.

On the other hand, if a $P_{acr}$ is reset to a lower altitude $P_{iso}$ will increase until the desired cabin pressure signal $P_d$ exceeds the maximum differential. The differential limiting circuit will then operate and limit the value of the output so that this differential maximum is not exceeded. FIGURE 8 shows the signal flow to produce the $P_d$ signal during the cruise phase with differential limiting as decibed above.

DESCENT PHASE OPERATION

As the aircraft commences its descent the signal flow will be as shown in FIGURE 9. The $P_a$ signal increases and when $P_a$ equals or is greater than $P_{acr}+.25$ p.s.i., the cruise relay 452 will deenergize thereby opening switch 450, closing switch 448 and connecting the pole of switch 446 to terminal 442. The descent relay 428 remains energized since a continuous current path remains from the positive side of the relay through switches 430 and 429 to ground. The closing of switch 448 closes the multiplier servo loop and causes it to operate as long as the switch 447 is held closed. The time this switch remains closed is a function of its delay which is adequate to set the initial conditions for the descent phase of the flight.

With an increase in the $P_a$ signal as the aircraft descends the input to the descent function generator 404 will diminish, thus causing the function generator output $P_d-P_{la}$ to decrease and causes the $P_d$ signal to increase. Thus the output from the scheduled generator increases until just prior to touchdown the output of the function generator 404 is essentially zero leaving $P_{al}+.15$ p.s.i. as the output signal. The purpose of the .15 p.s.i. bias is to assure that the aircraft is slightly pressurized at touchdown so that the cabin pressure must always reach the landing field pressure prior to touchdown.

The basic schedule generated for the descent phase is shown in FIGURE 11. The nonlinearity in the aircraft descent profile may be such that descent is slow above about 20,000 feet. Therefore, the schedule is desired to cause the cabin pressure to change as rapidly as the ambient pressure above 20,000 feet and maintain a comfortable rate of change as the aircraft descends more rapidly below this altitude. For this reason all the schedules above a predetermined level of $P_{al}-P_a$ of approximately 9 p.s.i. or 25,000 feet are the same. All the starting point loci are at the right of the curve and approach zero just before landing at the destination point. The effect of the closing of the servo loop at the start of the descent phase is similar to that of the ascent phase except that the multiplied output of the descent function generator is compared with $P_{al}$ in network 426.

Upon the landing of the aircraft, the wheel switch 429 is opened thereby deenergizing the descent relay 428 and connecting the bias from the network 468 through switch 470 to the rate limiter. Since the pilot has not yet altered the flight ground switch to the ground position, the output from this minimum $\Delta P$ circuit controls the outflow valve and thereby holds the cabin pressure to an equivalent altitude of $-200$ feet until the pilot alters the switch to the ground position and the network 468 takes over control.

Figure 1:
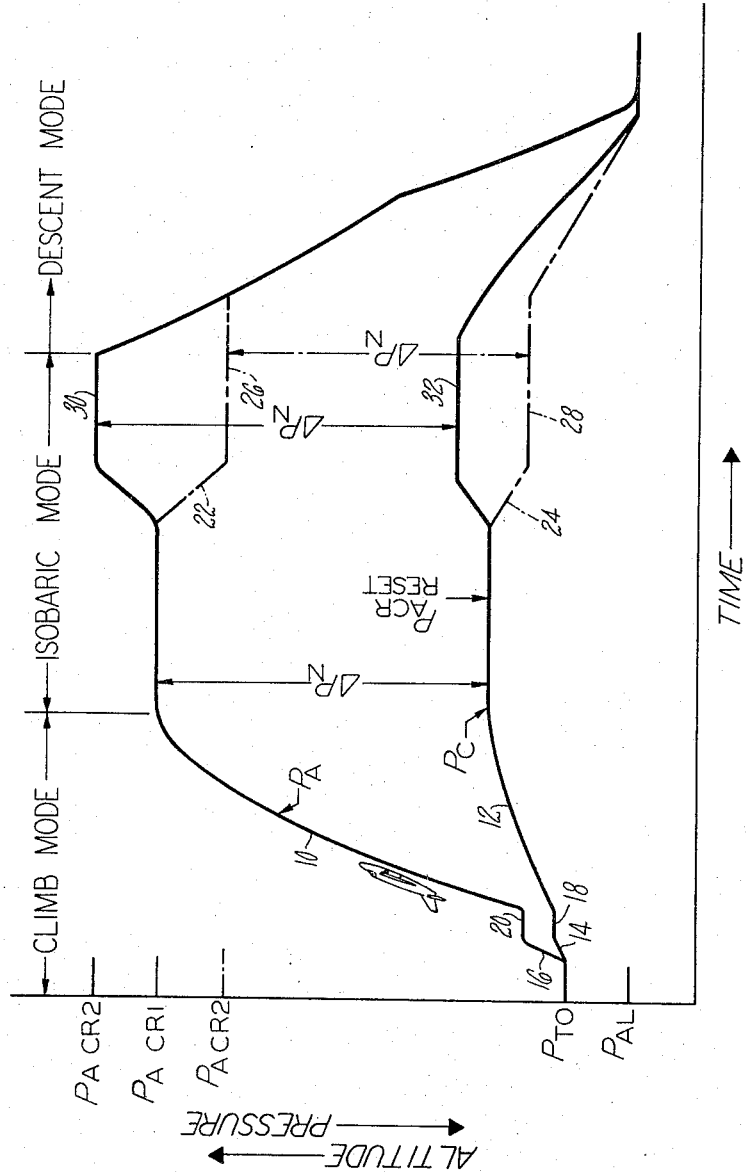
FIGURE 1 shows a typical flight pattern of an aircraft and the variations in the cabin pressure during this flight.

FIGURE 1 shows the flight of the plane from a takeoff pressure $P_{to}$ to a first selected cruising altitude indicated by the ambient signal $P_{acr1}$ to land at a destination having a pressure $P_{al}$ which is higher than that at the takeoff point since the landing field is located at a lower altitude. In FIGURE 1, altitudes increase going up and pressures increase going down. Curve 10 indicates the plot of the ambient pressure $P_a$ and curve 12 indicates the plot of the cabin pressure. $P_{acr2}$ represents a resetting of the cruise altitude. As the aircraft leaves the ground, the cabin altitude will immediately begin to rise as shown at 14. Since the schedule is proportional, the rate of increase will be proportional to that external to the aircraft as shown at 16. If the rapid climb is continued, the differential will continue to increase until the safety valve setting is reached. In the event that a flight is aborted prior to reaching the cruise altitude and prior also to making a change in the cruise altitude setting of $P_{acr}$, the descent will be made along the ascent schedule and return the cabin pressure to that of the takeoff field altitude. The OFF schedule descent light, however, will light indicating that a descent is being made without having reached the cruise altitude or within the climb phase. Cabin altitude will continue to increase, holding when the aircraft holds as at 18 and 20, until it reaches the cruise altitude at which the cabin control shifts to the criuse phase.

During the cruise phase it is possible that a lower cruise altitude is selected. In this case the cabin pressure will increase slightly until the maximum differential limiting is encountered. Thereupon the pressure in the cabin will be controlled by the maximum differential limiter until the aircraft descends again to its new cruise altitude. It is not necessary to change the cruise altitude until after the altitude change is in fact made, because the change in cabin pressure while the craft is descending will be made along the descent schedule. The curve portions 22, 24, 26 and 28 show the ambient and cabin pressure changes with a lower selected cruising altitude.

In the event a higher altitude is selected for the cruise phase such as indicated by the curve 30, then the cabin pressure must be increased to the level indicated by the curve 32. This is accomplished along the differential limit $\Delta P_n$ unless the $P_{acr}$ signal is changed to the new setting. A higher altitude setting has the effect of entering the descent mode and no change in the cabin pressure will occur until the aircraft actually commences the climb to the new altitude. Entering the descent mode by this change calls for the operation of the multiplier servo, and the subsequent climb is along the descent schedule until the aircraft reaches the newly selected higher altitude at which the cruise mode is entered.

The decrease in cabin altitude for descent will commence after the aircraft's external pressure has changed by approximately a quarter of a p.s.i. The cabin pressure will then increase at the same rate as the aircraft's ambient pressure increases unless the rate exceeds the 500 feet per minute rate limit setting. Similarly to what occurs during an ascent if a hold in the descent is made, the cabin pressure will also hold. As the aircraft approaches touchdown the cabin pressure will descend to a pressure level equivalent to approximately 300 feet below that of the landing field altitude. As soon as touch down occurs the cabin pressure will decrease at the limit established by the rate limiter to approximately 200 feet in altitude below that of the landing field altitude as determined by the minimum $\Delta P$ control. The cabin may subsequently be switched to the ground mode for cabin depressurization.

Another embodiment of this invention may be obtained by scheduling the desired cabin pressure signal as a function of the change in ambient pressure where the change commences at the minimum value and attains a known final value. Such an embodiment would schedule the desired cabin pressure according to the following equations:

$$\text{Ascent } P_d = P_{to} + \frac{P_{iso} - P_{to}}{P_{to} - P_{acr}} f(P_{to} - P_a)$$

$$\text{Descent } P_d = P_{iso} + \frac{P_{iso} - P_{al}}{P_{acr} - P_{al}} f(P_{acr} - P_a)$$

From these equations it can be seen that when $P_a = P_{to}$, $P_d$ is equal to the takeoff pressure $P_{to}$. After the craft has reached the cruising altitude where $P_a$ equals $P_{acr}$, $P_d$ equals $P_{iso}$. For the descent equation substitution of the initial value and the final values of $P_a$ result in desired cabin pressure signals which correspond precisely to actual conditions. Another way of looking at this embodiment and the one described in detail before, is that the initial and final values of $P_d$ are accurately determined and that the intermediate values are selected in accordance with the shape of the output of the function generators. These are selected in such a manner as to approximate a straight-line decrease and increase of the cabin pressure during the respective ascents and descents. The function generator may vary in its complexity depending upon how accurately it must eliminate the nonlinearity between the variation of the ambient pressure and the desired straight-line change in the cabin pressure. Several function generators could be combined adding complexity to the cabin pressure control but providing a straight-line cabin pressure change under most flight conditions. Such a schedule generator is described in the copending application Serial No. 564,226, filed July 11, 1966, entitled, "Electronic Schedule Generator Tracking Circuit," by Stanley G. Best and assigned to the same assignee.

FIGURE 13 shows a schedule generator wherein the input to function generators commences with the minimum value and reaches a predetermined final value. At the time of takeoff, a potentiometer 600 acts as a memory device by storing the ambient pressure which is also the cabin pressure. This is accomplished by feeding a $P_a$ signal to a difference network 602 in which the potentiometer wiper signal is subtracted from $P_a$ to produce an error signal which drives the servo 604 in the direction to reduce the error to zero. The error signal is applied through a switch 606 to the servo and this switch is controlled by the position of the wheels. At the time that the plane takes off, the switch is opened and the wiper position on the potentiometer is frozen. The wiper signal representing $P_{to}$ is applied to one of the terminals of switch 608. The other terminal of the double-throw single-pole switch 608 is $P_{acr}$.

Switches 608, 610, 612, 614 and 616 are controlled by the descent relay and are shown in the position during the ascent phase. When the descent relay becomes energized, the poles of the switches are connected to the other terminal. The terminals of switch 10 are connected to $P_{acr}$ and $P_{al}$ and the pole is connected to the difference network 618, the output of which is applied to the divide input of the multiplier divide network 620. The output of switch 608 is applied to the negative input of the difference network 624 and the positive inputs of the difference networks 618 and 622. In addition, $P_a$ is subtracted from the other input to difference network 622 to provide a signal for the ascent function generator 626 and the descent function generator 628. The output of the function generators is applied through the switch 614 to a multiplying input of the multiplying divide network 620.

The other inputs to the terminals of switch 616 are $P_{al}$ and $P_{iso}$. The signal present on the pole of switch 616 is aplied to the positive input of the difference amplifier 624 and the positive input to the summing amplifier 630. The output of the multiplying divide network 620 is added to the other input to summing network 630, the output of which provides the desired cabin pressure signal $P_d$.

The circuitry shown in FIGURE 13 accomplishes the performance of the equations shown in the figure. The function generators 626 and 628 will contain the desired output characteristics to compensate for the nonlinearity between the desired cabin pressure and the ambient pressure. The multiplier divider network may be an all electronic device, either digital or analog or a hybrid version thereof, or can take the form of potentiometers whose adjustable shafts are varied by appropriate servo systems. The takeoff pressure memory device can also be a digital register or analog integrated device that holds its output voltage relatively constant when the input signals are removed, for instance, a capacitor. A certain amount of drift is tolerable on the $P_{to}$ signal since the final value of $P_d$ obtained at cruise during ascent does not depend to a large degree upon $P_{to}$ so that slight deviations from the schedule during climb are not significant. On the other hand, the stored signal must be preserved for a sufficiently long time to allow an abort to return the aircraft to the takeoff field pressure so that drifts from the stored signal must be kept reasonably low for periods of fifteen minutes.

FIGURE 14 shows an alternate schedule generator wherein the desired cabin pressure signal is generated according to the formulas shown on the drawing. During ascent, the switch 730 is shown in the position as indicated. A signal indicative of the difference between $P_{iso}$ signal and $P_{acr}$ is generated at the output of the difference amplifier 706 and applied to the divider networks 704 and 710.

The other input to the divider network 710 is the difference signal $P_{to} - P_{acr}$ which is generated from the difference network 708. The output of the divider 710 is applied to a function generator 711 to produce a multiplication factor $K_a$. This factor is used to multiply the output of an ascent function generator 724. Ascent function generator 724 produces an output signal indicative of the difference between the desired cabin pressure signal $P_d$ and the ambient signal $P_a$ in response to another difference signal obtained from the difference network 726 wherein $P_a$ is subtracted from $P_{to}$. In network 722, the output of the ascent function generator is multiplied by $K_a$ to produce the desired difference signal $P_d-P_a$. With the switch 730 in the indicated position, the ambient signal $P_a$ is added in network 732 to provide the desired cabin pressure signal $P_d$.

The descent operation is quite similar to that for the ascent and the output from the difference network 706 is divided by $P_{al}-P_{acr}$ in the divider circuit 704. The denominator difference signal is obtained from the difference circuit 702 where $P_{acr}$ is subtracted from $P_{al}$. The output from the divider circuit 704 is an input to the function generator 712 to provide a multiplication factor $K_d$ which is used to multiply the descent function generator 718 output in the multiplier circuit 720. The descent function generator produces a signal indicative of the difference between $P_d$ and $P_a$ as a function of the difference between $P_a$ and $P_{al}$, derived from the difference circuit 716 wherein $P_{al}$ is subtracted from $P_a$. During descent, the switch 730 connects the pole to the output of the multiplier circuit 720 and by adding the $P_a$ signal to the summing network 732, the desired cabin pressure signal $P_d$ is produced in the output.

It thus may be seen that the mechanism of FIGURE 14 accomplishes the computations indicated by the formulas. Both the ascent and descent function generators commence with a minimum output signal and increase to a maximum change in the cabin pressure signal as a function of the change in external or ambient pressure for the particular flight phase during which these devices control the cabin pressure.

It is to be understood that the invention is not limited to the specific embodiments herein illustrated and described but may be used in other ways without departure from its spirit as defined by the following claims.

I claim:

1. A device for automatically regulating the pressure in an aircraft cabin exposed to varying external air pressure comprising:
   means for sensing the pressure of the environment external to the cabin and producing an ambient signal indicative thereof,
   means for scheduling a signal indicative of a preselected pressure level of said external environment,
   means responsive to the ambient signal and the preselected external cabin pressure signal for generating a signal indicative of the difference therebetween,
   means responsive to the difference signal for producing a signal indicative of the desired pressure in the cabin,
   means for sensing the actual cabin pressure and producing a signal indicative thereof, and
   means comparing the actual pressure signal with the desired cabin pressure signal and producing an error signal for varying the cabin pressure in a direction tending to drive said error signal to a minimum.

2. A device as recited in claim 1 wherein said desired cabin pressure signal producing means further comprises:
   function generator means responsive to the difference pressure signal and acting thereon according to a predetermined relationship for producing a signal indicative of a scheduled change in the desired cabin pressure signal,
   means for generating a signal indicative of a preselected cabin pressure, and
   means combining the signal indicative of the scheduled change in the desired cabin pressure with the preselected cabin pressure signal for producing said desired cabin pressure signal.

3. A device as recited in claim 2 wherein said function generator means further comprises:
   a variable multiplier circuit having its input coupled to the scheduled change in cabin pressure signal for multiplying the scheduled change signal according to a variable factor, and
   selectively actuated feedback means responsive to the desired cabin pressure signal and the actual cabin pressure signal for producing a correction signal and applying the correction signal to the variable multiplier circuit to match the desired cabin pressure signal with the actual cabin pressure signal.

4. A device as recited in claim 3 wherein the feedback means includes:
   means comparing the desired cabin pressure signal with the actual cabin pressure signal and producing the correction signal, and
   switch means selectively actuated for applying the correction signal to the multiplier circuit and varying the multiplication factor in a direction tending to match the desired cabin pressure signal with the actual cabin pressure signal.

5. A device as recited in claim 4 and wherein the multiplier circuit comprises:
   a variable resistor having an adjustable terminal and a fixed terminal with the fixed terminal coupled to the scheduled change in cabin pressure signal and producing the multiplied output on the adjustable terminal, and
   where the correction signal applying means includes:
     a servomotor actuated by the correction signal and coupled to the adjustable terminal for varying the multiplication factor.

6. A device as recited in claim 2 and further comprising:
   a rate limiter circuit responsive to the desired cabin pressure signal for limiting the rate of change of the desired cabin pressure signal within a predetermined range.

7. A device as recited in claim 2 and further comprising:
   means for generating a differential signal indicative of the maximum allowable difference between the external cabin pressure and the cabin pressure,
   selecting means responsive to the ambient signal, the desired cabin pressure signal and the maximum differential signal for
     producing a reduction in the desired cabin pressure signal commensurate with and during the excess of the desired cabin pressure over the sum of the external pressure and the maximum differential pressure, and
     producing the desired cabin pressure when the desired cabin pressure is less than the sum of the external pressure and the maximum differential pressure.

8. A device as recited in claim 7 and further comprising:
   a rate limiter circuit interposed between the selecting means and the comparing means for limiting the rate of change of the desired cabin pressure signal within a predetermined range.

9. A device as recited in claim 7 wherein the selecting means further comprises:
   a summing network producing a signal indicative of the sum of the ambient signal and the differential signal,
   means responsive to the summed signal and the desired cabin pressure signal for producing a signal commensurate with and during the excess of the summed signal over the desired cabin pressure signal, and
   means reducing the desired cabin pressure signal by the summed signal to maintain the cabin pressure within the allowable differential.

10. A device for automatically regulating the pressure in an aircraft cabin by controlling the flow of air from an outflow valve during the ascent, cruise and descent flight phases of the aircraft comprising:
    means for sensing the air pressure external to the aircraft cabin and producing an ambient signal indicative thereof, means for scheduling a signal indicative of the external cabin pressure at a preselected altitude of the aircraft, means responsive to the ambient signal and the preselected external pressure signal for generating a signal indicative of the scheduled change in the external cabin pressure during a flight phase, signal modifying means responsive to the scheduled change in the external cabin pressure signal for producing a signal indicative of a scheduled change in the cabin pressure during the flight phase, means for generating a terminal cabin pressure signal indicative of a preselected cabin pressure at the termination of the first flight phase, means for generating a cruise signal indicative of a preselected cabin pressure during the cruise phase, means responsive to the cruise signal, the terminal cabin pressure signal and the scheduled change in the cabin pressure signal for producing a desired cabin pressure signal for the first flight phase and the cruise phase, means for sensing the actual cabin pressure and producing a signal indicative thereof, means comparing the actual cabin pressure signal with the desired cabin pressure signal for producing an error signal indicative of the difference therebetween, said error signal being adapted for the varying of the outflow valve in a direction tending to match the actual cabin pressure signal with the desired cabin pressure signal.

11. A device as recited in claim 10 wherein said desired cabin pressure signal producing means comprises:

means responsive to the terminal cabin pressure signal and the scheduled change in cabin pressure signal for producing an output signal indicative of the desired cabin pressure during the first flight phase, means for sensing the occurrence of a flight phase and producing a switching signal indicative thereof, and switch means having its input coupled to the cruise signal and the output signal and activated by the switching signal for producing the desired cabin pressure signal.

12. A device as recited in claim 11 and further comprising:

a rate limiter circuit interposed between the desired cabin pressure signal producing means and the comparing means for limiting the rate of change of the desired cabin pressure signal within a predetermined range.

13. A device as recited in claim 10 wherein the means for scheduling the preselected cabin pressure cruise signal comprises:

means for scheduling a signal indicative of the external pressure at the landing point of the aircraft, means for scheduling a signal indicative of the external pressure at the cruising altitude of the aircraft, means for generating a differential signal indicative of an allowable differential between the external pressure and the internal cabin pressure, means for summing the differential signal and the scheduled external cruise pressure signal, and means responsive to the scheduled external landing pressure signal and the summed signal for selecting the signal representative of the lower pressure and producing the cruise signal indicative thereof.

14. A device for automatically regulating the pressure in an aircraft cabin by varying an outflow valve during flight phases of the aircraft including takeoff, ascent and descent, and landing at the scheduled destination of the aircraft comprising:

means for sensing the pressure of the air external to the aircraft and producing an ambient signal indicative thereof, means for scheduling a signal indicative of the external pressure at a preselected cruising altitude of aircraft, means for scheduling a signal indicative of the pressure at the destination of the aircraft, means responsive to the cruising signal and the ambient signal for producing a first variable control signal having an initial value indicative of the maximum scheduled change in cabin pressure from takeoff to cruise and a final minimum value as the aircraft approaches the preselected cruise altitude, means responsive to the destination signal and the ambient signal for generating a second vairable control signal having an initial value indicative of the maximum scheduled change in the cabin pressure from cruise to destination and a final minimum value as the aircraft approaches the destination, signal modifying means coupled to the first variable control signal and the second variable control signal for selectively producing a signal indicative of the desired cabin pressure, said desired cabin pressure bearing a predetermined relationship to the selected variable control signal, means for sensing the actual cabin pressure and producing a signal indicative thereof, and means comparing the actual pressure signal with the desired cabin pressure signal and producing an error signal for varying the outflow valve in a direction tending to drive said error signal to a minimum.

15. A device for automatically regulating the pressure in an aircraft cabin by varying an outflow valve during the flight phases of the aircraft including takeoff, ascent and descent, and landing at the scheduled destination of the aircraft comprising:

means for sensing the pressure of the air external to the aircraft and producing an ambient signal indicative thereof, means for storing a takeoff signal indicative of the external ambient pressure at the takeoff altitude of the aircraft, means for scheduling a signal indicative of the external pressure at a preselected cruising altitude of the aircraft, means for scheduling a signal indicative of the pressure at the destination of the aircraft, means responsive to the takeoff signal and the ambient signal for producing a first variable control signal having an initial value indicative of a minimum scheduled change in cabin pressure from takeoff to cruise and a final maximum value as the aircraft approaches the preselected cruise altitude, means responsive to the destination signal and the ambient signal for generating a second variable control signal having an initial value indicative of the minimum scheduled change in the cabin pressure from cruise to destination and a final maximum value as the aircraft approaches the destination, signal modifying means coupled to the first variable control signal and the second variable control signal for selectively producing a signal indicative of the desired cabin pressure, said desired cabin pressure bearing a predetermined relationship to the selected variable control signal, means for sensing the actual cabin pressure and producing a signal indicative thereof, and means comparing the actual pressure signal with the desired cabin pressure signal and producing an error signal for varying the outflow valve in a direction tending to drive said error signal to a minimum.

16. A device for automatically regulating the pressure in an aircraft cabin by varying an outflow valve during the ascent flight phase from takeoff to cruise comprising:

means for sensing the pressure of the air external to the aircraft and producing an ambient signal indicative thereof, means for scheduling a signal indicative of the external pressure at a preselected cruising altitude of the aircraft, means responsive to the cruising signal and the ambient signal for producing a variable control signal having an initial value indicative of the maximum scheduled change in cabin pressure from takeoff to cruise and a final minimum value as the aircraft approaches the preselected cruise altitude, signal modifying means coupled to the variable control signal for producing a signal indicative of the desired cabin pressure, said desired cabin pressure signal bearing a predetermined relationship to the variable control signal, means for sensing the actual cabin pressure and producing a signal indicative thereof, and means comparing the actual pressure signal with the desired cabin pressure signal and producing an error signal for varying the outflow valve in a direction tending to drive said error signal to a minimum.

17. A device as recited in claim 16 wherein the variable control signal producing means and the signal modifying means comprise:

function generator means producing an output signal indicative of the scheduled change in internal cabin pressure during the ascent phase, means for matching the output signal to the ambient external cabin pressure at the takeoff point, means for generating a cabin cruise signal indicative of the cabin pressure at the termination of the ascent phase and during the cruise phase, and means comparing the output signal with the cabin cruise signal for producing the desired cabin pressure signal.

18. A device as recited in claim 17 wherein the matching means comprises:

a servomotor, means coupled to the servomotor for varying the output signal of the function generator means, and means comparing the desired cabin pressure signal with the actual cabin pressure signal for producing a signal indicative of the difference therebetween and selectively applying said difference signal to the servomotor to vary the output signal from the function generator means and reduce the difference signal to a minimum.

19. A device for automatically regulating the pressure in an aircraft cabin by varying an outflow valve during the descent flight phase comprising:

means for sensing the pressure of the air external to the aircraft and producing an ambient signal indicative thereof, means for scheduling a signal indicative of the pressure at the destination of the aircraft, means responsive to the destination signal and the ambient signal for generating a variable control signal having an initial value indicative of the maximum scheduled change in the cabin pressure from cruise to destination and a final minimum value as the aircraft approaches the destination, signal modifying means coupled to the variable control signal for producing a signal indicative of the desired cabin pressure, said desired cabin pressure signal bearing a predetermined relationship to the variable control signal, means for sensing the actual cabin pressure and producing a signal indicative thereof, and means comparing the actual pressure signal with the desired cabin pressure signal and producing an error signal for varying the outflow valve in a direction tending to drive said error signal to a minimum.

20. A device as recited in claim 19 wherein variable control generating means and the signal modifying means comprise:

function generator means producing an output signal indicative of the scheduled change in internal cabin pressure during the descent phase, means for matching the output signal with the actual cabin pressure signal at the commencement of the descent phase, and means comparing the output signal with the destination signal for producing the desired cabin pressure signal.

21. A device as recited in claim 20 wherein the matching means comprises:

a servomotor, means mechanically coupled to the servomotor for varying the output signal from the function generator means, and means comparing the desired cabin pressure signal with the actual cabin pressure signal for producing a signal indicative of the difference therebetween and selectively applying said difference signal to the servomotor to vary the output signal and reduce the difference signal to a minimum.

22. A device for automatically regulating the air pressure in an aircraft cabin by modulating an outflow valve during the takeoff and ascent flight phases and up to the cruise flight phase comprising:

means for sensing the pressure of the air external to the aircraft and producing an ambient signal indicative thereof, means for scheduling a signal indicative of the external pressure at a preselected cruising altitude of the aircraft, means for storing a takeoff signal indicative of the external ambient pressure at the takeoff altitude of the aircraft, means responsive to the takeoff signal and the ambient signal for producing a variable control signal having an initial value indicative of a minimum scheduled change in the cabin pressure from takeoff to cruise and a final maximum value as the aircraft approaches the preselected cruise altitude, signal modifying means coupled to the variable control signal for producing a signal indicative of the desired cabin pressure, said desired cabin pressure signal bearing a predetermined relationship to the variable control signal, means for sensing the actual cabin pressure and producing a signal indicative thereof, and means comparing the actual pressure signal with the desired cabin pressure signal and producing an error signal for varying the outflow valve in a direction tending to drive said error signal to a minimum.

23. A device for automatically regulating the air pressure in an aircraft cabin by modulating an outflow valve during the descent and landing at the destination flight phases following the cruise flight phase comprising:

means for sensing the pressure of the air external to the aircraft and producing an ambient signal indicative thereof, means for scheduling a signal indicative of the pressure at the destination of the aircraft, means responsive to the destination signal and the ambient signal for generating a variable control signal having an initial value indicative of the minimum scheduled change in the cabin pressure occurring during the rescent phase and a final maximum value as the aircraft approaches the destination, signal modifying means coupled to the variable control signal for producing a signal indicative of the desired cabin pressure, said desired cabin pressure signal bearing a predetermined relationship to the variable control signal, means for sensing the actual cabin pressure and producing a signal indicative thereof, and means comparing the actual pressure signal with the desired cabin pressure signal and producing an error signal for varying the outflow valve in a direction tending to drive said error signal to a minimum.

24. A device for automatically regulating the pressure in an aircraft cabin exposed to varying external pressures during the ascent, cruise and descent phases of the flight of the aircraft comprising:

means for sensing the pressure of the environment external to the aircraft and producing an ambient voltage indicative thereof, means for scheduling a voltage indicative of the external pressure at a preselected cruising altitude of the aircraft, means for scheduling a voltage indicative of the external pressure at a preselected landing altitude of the aircraft, means including a first difference amplifier having its input coupled to the ambient voltage and the preselected cruise voltage for producing a first difference voltage indicative of the scheduled change in external pressures for the ascent phase of the aircraft, means including a second difference amplifier having its input coupled to the ambient voltage and the preselected landing voltage for producing a second difference voltage indicative of the scheduled change in external pressures for the descent phase of the aircraft, means including an ascent function generator having its input coupled to the first difference voltage and producing an ascent cabin voltage indicative of the desired internal cabin pressure for the ascent phase, said ascent desired cabin voltage bearing a predetermined relationship to said first difference voltage, means includng a descent function generator having its input coupled to the second difference voltage and producing a descent cabin voltage indicative of the desired internal cabin pressure for the rescent phase, said descent desired cabin voltage bearing a predetermined relationship to said second difference voltage, switch means having an input and an output with the input coupled to the ascent desired cabin voltage and the descent desired cabin voltage for selectively coupling one of the input voltages to the output upon the occurrence of a preselected flight phase of the aircraft, means for sensing the actual cabin pressure and producing a voltage indicative thereof, and means comparing the actual cabin pressure voltage with the desired cabin pressure voltage and producing an error voltage for varying the cabin pressure in a direction tending to drive said error voltage to a minimum.

25. A device for automatically regulating the pressure in an aircraft cabin by modulating the flow of air from an outflow valve comprising:

means producing a signal indicative of the desired cabin pressure, a rate limiter circuit coupled to the desired cabin pressure signal for limiting the rate of change of the desired cabin pressure signal within a predetermined range, means for sensing the actual cabin pressure and producing a signal indicative thereof, means coupled to the rate limited desired cabin pressure signal and the actual cabin pressure signal for producing an error signal indicative of the difference therebetween, and means applying the error signal to the outflow valve for modulating the valve and varying the flow of air therefrom to reduce said error signal to a minimum and match the acual cabin pressure to the desired cabin pressure.

26. A device as recited in claim 25 wherein the rate limiter circuit further comprises:

an integrator producing an output signal having a predetermined maximum rate of change in response to an input signal, and means coupled to the desired cabin pressure signal and the integrator output signal for producing a signal indicative of the difference therebetween and applying the difference signal to the integrator input.

References Cited
UNITED STATES PATENTS

| | | | |
|---|---|---|---|
| 2,549,672 | 4/1951 | Del Mar | 98—1.5 |
| 2,578,773 | 12/1951 | Arthur | 98—1.5 |
| 2,620,719 | 12/1952 | Price | 98—1.5 |
| 2,701,514 | 2/1955 | Del Mar | 98—1.5 |
| 2,873,661 | 2/1959 | Fischer | 98—1.5 |
| 3,141,399 | 7/1964 | Andresen | 98—1.5 |

MEYER PERLIN, *Primary Examiner.*